United States Patent [19]

Katznelson et al.

[11] Patent Number: 5,068,729

[45] Date of Patent: Nov. 26, 1991

[54] COMPATIBLE EXTENDED-DEFINITION TELEVISION

[75] Inventors: Ron D. Katznelson; Edward A. Krause, both of San Diego, Calif.

[73] Assignee: General Instrument Corporation, New York, N.Y.

[21] Appl. No.: 413,881

[22] Filed: Oct. 2, 1989

Related U.S. Application Data

[63] Continuation-in-part of Ser. No. 258,143, Oct. 14, 1988, abandoned.

[51] Int. Cl.$^5$ .......................... H04N 7/00; H04N 11/00
[52] U.S. Cl. .......................................... 358/141; 358/12
[58] Field of Search ..................... 358/11, 12, 140, 141

[56] References Cited

U.S. PATENT DOCUMENTS

| | | | |
|---|---|---|---|
| 4,551,754 | 11/1985 | Meise et al. | 358/180 |
| 4,782,383 | 11/1988 | Isnardi | 358/12 |
| 4,855,824 | 8/1989 | Fuhrer | 358/12 |
| 4,876,596 | 10/1989 | Faroudja | 358/11 |
| 4,881,125 | 11/1989 | Krause | 358/140 |
| 4,935,816 | 6/1990 | Faber | 358/140 |

OTHER PUBLICATIONS

David Sarnoff Research Center, Inc., Advanced Compatible Television, System Description, Technical Report, submitted to FCC Advisory Committee on Advanced Television Systems, Sep., 1988.

Fukinuki, T., Hirano, Y. and Yoshigi, H., Experiments on Proposed Extended-Definition TV with Full NTSC Compatibility. SMPTE Journal: 923-929, Oct., 1984.

Isnardi, M. A., Fuhrer, J. S., Smith, R. T., Koslov, J. L., Roeder, B. J., and Wedham, W. F., A Single Channel, NTSC Compatible Widescreen EDTV System, In Third International Colloquium on Advanced Television Systems: HDTV '87, Oct. 4-8, Ottawa, Canada 1987.

"Advanced Television Standards", by Hopkins; IEEE Transactions on Consumer Electronics; Feb. 1988, pp. 1-15.

*Primary Examiner*—John W. Shepperd
*Attorney, Agent, or Firm*—Edward W. Callan

[57] ABSTRACT

A wide-aspect-ratio television signal is encoded for transmission within a standard-television-signal-compatible format is encoded by dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; arranging the center panel segments for transmission in the standard-television-signal-compatible format; reducing the spatial frequency extent of at least a portion of said side-panel segments by vertically expanding said portion; and inserting said vertically expanded portion of the side-panel segments for transmission during transmission of said center-panel segments in a manner that enables said inserted portion of the side panel segments to be separated from the center panel segments. The center-panel segments are transmitted in a temporal-vertical-frequency domain that includes Fukinuki holes; and the vertically expanded portion is inserted within said Fukinuki holes. The signal is further encoded by producing an augmentation signal from the side panel segments, which includes side-panel chrominance information and low-horizontal-frequency and low-vertical-frequency side-panel luminance information; modulating the side-panel chrominance information of said augmentation signal within a predetermined frequency band that does not overlap said low-horizontal-frequency and low-vertical-frequency side-panel luminance information; and inserting said modulated augmentation signal within the vertical blanking interval for transmission. Different encoding and separation modes are used when the source is 24 frame per second film exploiting the 3:2 pull down scheme.

15 Claims, 11 Drawing Sheets

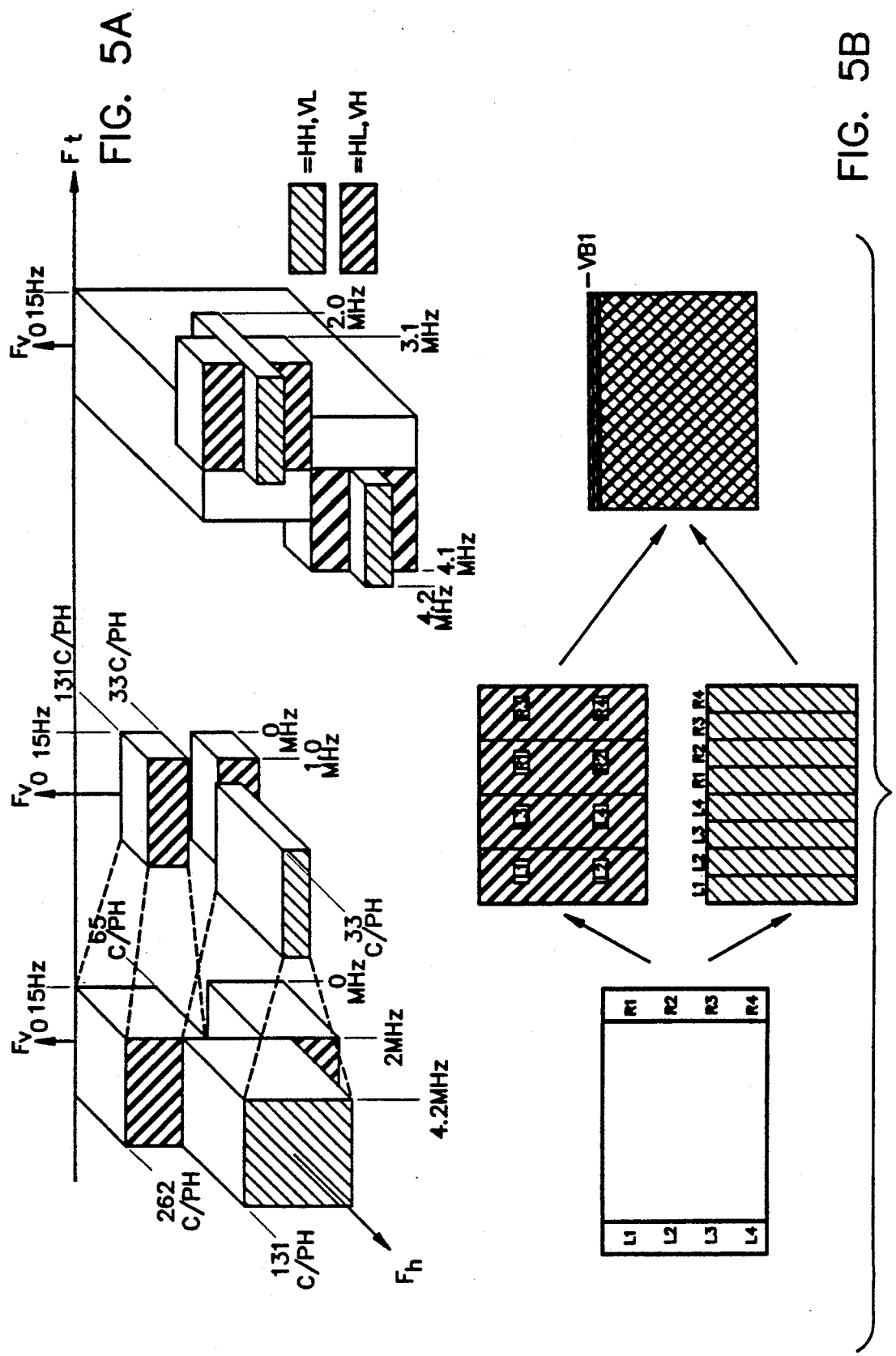

COMPATIBLE EXTENDED-DEFINITION TELEVISION

CROSS-REFERENCE TO RELATED APPLICATION

This application is a continuation-in-part of application Ser. No. 07/258,143 filed Oct. 14, 1988, now abandoned.

BACKGROUND OF THE INVENTION

The present invention generally pertains to television systems and is particularly directed to improvements in extended-definition television (EDTV) systems.

An EDTV system provides extended definition video with a display having a wide-aspect ratio, such as 5:3 or 16:9, in contrast to the 4:3-aspect-ratio display produced from a standard NTSC television signal.

One method for achieving a compatible EDTV system is to utilize the "Fukinuki hole" which has been shown to exist in the NTSC spectrum, for transmitting additional video information required to provide a wide-aspect-ratio video display. The Fukinuki hole is described by Fukinuki, Hirano and Yoshigi, "Experiments on Proposed Extended-Definition TV with Full NTSC Compatibility", SMPTE Journal, pp. 923-929, October, 1984. In the standard NTSC signal the chrominance information occupies alternate quadrants C of a temporal-vertical-frequency domain, as shown in FIG. 1. The location of the luminance information in this domain is indicated by Y. The Fukinuki holes are the alternate quadrants F of such temporal-vertical-frequency domain that are above 2.0 MHz horizontal frequency and are not occupied by the chrominance information. In addition to a 131 cycles/picture height vertical offset and a 15 Hz temporal offset, a horizontal offset of at least 2 Mhz is desirable. The size and properties of the Fukinuki holes are therefore very similar to those of chrominance. The line-to-line and field-to-field phase relationships of both the chrominance information and the Fukinuki holes are shown in FIG. 2. In FIG. 2, FD indicates the fields, SL indicates the scan lines, $\theta$ indicates the phase of the chrominance information, $\phi$ indicates the phase of the Fukinuki holes.

If the additional video information required to provide a wide-aspect-ratio video display is encoded and modulated to provide augmentation signals that fit in the Fukinuki hole, then the presence of the augmentation signals would not be detected by existing standard NTSC receivers. At the same time, EDTV receivers would be able to extract the augmentation signals and process them to provide a wide-aspect-ratio video display.

An EDTV system that utilizes the Fukinuki hole for insertion of such augmentation signals is described in a report entitled "System Description, Advanced Compatible Television" submitted by the David Sarnoff Research Center, Inc. to the FCC Advisory Committee on Advanced Television Systems, Sept. 1, 1988. Such system is referred to herein as the "ACTV system". The ACTV system encodes a wide-aspect-ratio television signal having luminance information and chrominance information for transmission within a standard-television-signal-compatible interlaced format by dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; arranging the center panel segments for transmission in the standard-television-signal-compatible format; producing augmentation signals from the side panel segments; and inserting the augmentation signals in the Fukinuki holes of the center panel segments.

The technique used to pack the augmentation signals in the Fukinuki holes is critical to the overall performance of both the old NTSC and the new EDTV receivers. Since some crosstalk is likely to exist between the augmentation signal that is transmitted in the Fukinuki hole and the existing luminance and chrominance signals, it is essential to encode the augmentation signals in a manner that minimizes perceptible inteference in existing NTSC receivers, and yet permits accurate separation and processing of the augmentation signals in new EDTV receivers.

The technique used in the ACTV system that enables the augmentation signals inserted in the Fukinuki holes to be separated from the center-panel luminance information is to group pixels into pairs spanning two adjacent lines in two adjacent fields, as shown in FIG. 13. If the augmentation signal in a Fukinuki hole (F), center-panel chrominance (C), and the component of center panel luminance exceeding 2 Mhz (Y), are each constrained to have the same values at the two different pixel locations, then it becomes possible to extract the augmentation signal F. This is because of a 180 degree phase shift that affects the Fukinuki hole subcarrier but not the color subcarrier.

$$Y + C = \frac{S_a + S_b}{2} \quad \{\text{Eq. 1}\}$$

$$F = \frac{S_a - S_b}{2} \quad \{\text{Eq. 2}\}$$

Separation of center-panel luminance information and chrominance information can then be performed by conventional line comb filtering or other prior art techniques.

In all cases, the degradation resulting from such errors as nonlinearities, differential phase, differential gain, sideband asymmetry, and channel noise should be minimized since they introduce residual errors and crosstalk effects.

Crosstalk from the augmentation signals to center-panel luminance information will produce the same dot structure as the crosstalk with center-panel luminance information originating from the chrominance information. The difference is that the dots will appear to crawl down the screen instead of up. An increase in horizontal or vertical frequency of the signals injected by the Fukinuki signal increases the horizontal or vertical size of the dots making them more visible and objectionable, while an increase in temporal frequency reduces the rate of crawl.

The dotted arrow in FIG. 1 shows that such increases in the vertical frequency content of the augmentation signal causes a decrease in the vertical frequency of the crosstalk signal imparted on the luminance channel, thereby making it more visible.

Crosstalk can also occur from the augmentation signals to the chrominance information, and in this case, existing comb filters will not be effective. In most cases, such crosstalk appears as a color flicker visible at low display spatial frequency. In theory, the average color produced by this flicker should be neutral. At high injection levels, however, some color may be visible due to nonlinearities during the conversion of I and Q chrominance components to the RGB phosphors of the cathode ray tube display. In addition, the visibility of color flicker increases as the vertical frequency or temporal frequency content of the augmentation signals increases, when the augmentation signals invade into the chrominance quadrants as shown by the dotted arrow emanating from the F region in FIG. 1.

In the ACTV system, the visibility of any crosstalk between the center-panel luminance information and the augmentation signal inserted in the Fukinuki holes will be greatly magnified in existing NTSC receivers due to the use of augmentation signals that are uncorrelated with either the luminance or chrominance information for the center panel. The crosstalk between the center-panel luminance information and the center chrominance information inserted in the alternate quadrants C of the temporal-vertical-frequency domain is not particularly noticeable in existing NTSC receivers because the center-panel chrominance information is correlated with the center-panel luminance information.

Consequently, the bandwidth of the augmentation signal must be minimized to insure that it does not exceed the boundaries of the Fukinuki hole, and the injection level must be reduced as much as possible. Unfortunately, as the injection level is reduced, the side panel signal-to-noise ratio S/N decreases and linearity of the new EDTV receivers becomes critical if crosstalk from the center panel to the side panels is to be prevented.

In the ACTV system, side-panel low spatial frequency components are horizontally compressed substantially so as to fit in a fixed narrow strip at the left and right picture edges. This results in two disadvantages: The first is the significant loss of signal-to-noise ratio (S/N), as compared to center panel S/N, causing a non-uniform and discernable "noise panel" effect in the EDTV display with a decrease in channel carrier-to-noise ratio. The second disadvantage of such side panel compression encoding of "horizontal lows" is that it imposes rigidity on the relative size of the left and right side panel. This would eliminate the use of "pan and scan" encoding which allows the operator to control by panning a center panel picture over a wider aspect ratio source picture. If the ACTV system were to attempt varying the relative size of the side panels, the center panel would appear to move from left to right in old standard aspect ratio television sets.

In the ACTV system, constraints are placed on temporal samples in successive video fields which are directed towards video sources at 30 frames per second. If, however, the video is derived from film in a 3-2 pulldown scheme, the method most common in North America, then motion artifacts due to the ACTV temporal constraints may result, since they are combined asynchronously with frame repetition film effects peculiar to the 3-2 pulldown process.

One object of the invention is to provide compatible side panel transmission with "Pan and Scan" capability by judicial use of the VBI and the Fukinuki hole.

A further object of the invention is to provide such side panel transmission with improved noise performance for FM and AM channels by facilitating higher injection levels of the "Fukinuki" signal by employing vertical expansion of side panel video information.

Yet another object of the invention is to provide motion error free transmission of such video signals derived from 24 frame per second film.

Still another object of the invention is to offer a better method for chrominance-luminance separation both for side panel and center panel video information.

SUMMARY OF THE INVENTION

The present invention utilizes the same general encoding technique as the ACTV system for enabling the augmentation signals to be separated from the center-panel luminance information. However, the present invention utilizes an augmentation signal format that has a more compact transmitted frequency spectrum, and which results in better signal-to-noise ratio (S/N) characteristics, and an increase in displayed diagonal resolution when compared to the ACTV system.

Minimal interference with center-panel luminance information is achieved by reducing the bandwidth of the augmentation signals as much as possible in the dimensions of both horizontal frequency and vertical frequency.

The present invention provides an encoder for encoding a wide-aspect-ratio television signal for transmission within a standard-television-signal-compatible format. The encoder of the present invention includes means for dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; means for arranging the center panel segments for transmission in the standard-television-signal-compatible format; means for reducing the spatial frequency extent of at least a portion of said side-panel segments by vertically expanding said portion; and means for inserting said vertically expanded portion of the side-panel segments for transmission during transmission of said center-panel segments in a manner that enables said inserted portion of the side panel segments to be separated from the center panel segments. Preferably the vertically expanded portion of the side-panel segments is inserted within said Fukinuki holes.

In another aspect, the encoder of the present invention includes means for dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; means for arranging the center panel segments for transmission in the standard-television-signal-compatible format, which includes a vertical blanking interval; means for producing an augmentation signal from the side panel segments, which includes side-panel chrominance information and low-horizontal-frequency and low-vertical-frequency side-panel luminance information; means for modulating the side-panel chrominance information of said augmentation signal within a predetermined frequency band that does not overlap said low-horizontalfrequency and low-vertical-frequency side-panel luminance information; and means for inserting said modulated augmentation signal within the vertical blanking interval for transmission.

In a further aspect, the encoder of the present invention includes means for dividing the television signal into center-panel segments from which the horizontally centeral portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; means for arranging the center panel segments for transmission in the standard-television-signal-compatible format, which includes a predetermined number of horizontal lines per field, with a first number of the horizontal lines defining a vertical blanking interval, and the chrominance information being within a predetermined frequency band modulated on and extending from a subcarrier frequency, with the chrominance information occupying alternate quadrants of a temporal-vertical-frequency domain; means for producing first, second and third augmentation signals from the side panel segments, wherein the first augmentation signal includes chrominance information and low-horizontal-frequency and low-vertical-frequency side-panel luminance information, the second augmentation signal includes low-horizontal-frequency and high-vertical-frequency luminance information, and the third augmentation signal includes high-horizontal-frequency and low-vertical-frequency luminance information; means for modulating the side-panel chrominance information of said first augmentation signal within said predetermined frequency band modulated on and extending from said subcarrier frequency and for inserting said modulated first augmentation signal within the vertical blanking interval; means for modulating the second augmentation signal within said predetermined frequency band and for inserting said second augmentation signal in first predetermined locations within the Fukinuki holes of said temporal-vertical-frequency domain; and means for inserting the third augmentation signal within second predetermined locations within said Fukinuki holes not occupied by the second augmentation signal.

In still another aspect, the encoder of the present invention includes means for dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; means for arranging the center panel segments for transmission in the standard-television-signal-compatible format in a temporal-vertical-frequency domain that includes Fukinuki holes; wherein said inserting means include means for inserting said vertically expanded portion of the side-panel segments within said Fukinuki holes; and means for arranging at least a portion of said side-panel segments for insertion within said Fukinuki holes for transmission, including means for arranging said portion of the side-panel segments in a manner that enables said inserted portion of the side panel segments to be separated from the center panel segments.

The present invention further provides a decoder for reproducing a wide-aspect-ratio television signal having luminance information and chrominance information from an encoded signal transmitted within a standard-television-signal-compatible format, wherein the wide-aspect-ratio television signal was encoded by the encoder of the present invention.

Additional features of the present invention are described in relation to the description of the preferred embodiments.

BRIEF DESCRIPTION OF THE DRAWING

FIG. 5A is a diagram illustrating with respect to the dimensions of vertical frequency, horizontal frequency and temporal frequency, the formation of the second and third augmentation signals and their insertion into the the Fukinuki holes.

FIG. 5B is a diagram illustrating with respect to the scanning raster of the video signal, the relocation of side-panel luminance information for interspersed transmission with the center-panel information during the center-panel scanning intervals.

DESCRIPTION OF THE PREFERRED EMBODIMENTS

Figure 3:
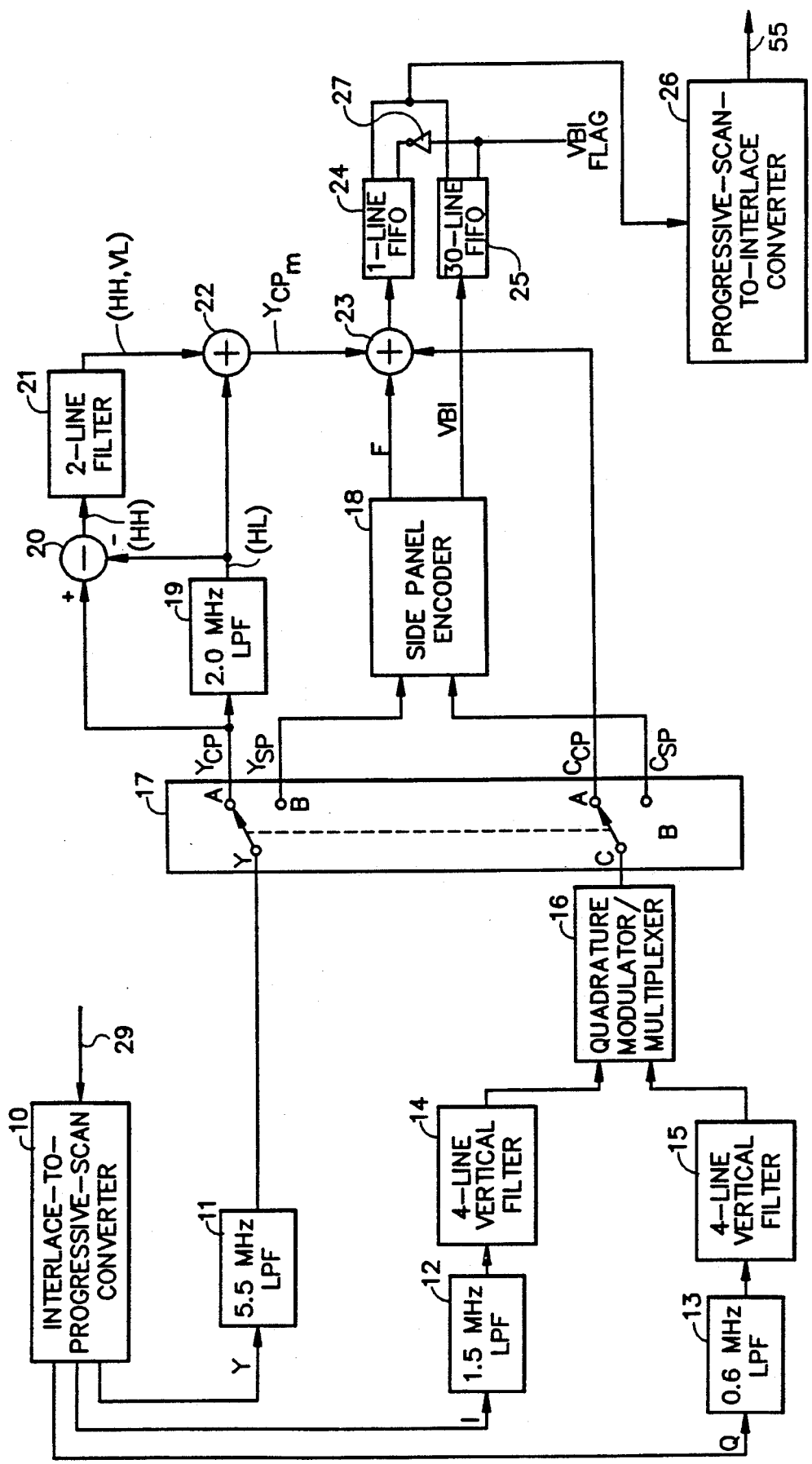
FIG. 3 is a block diagram of an encoder according to the present invention.

Referring to FIG. 3, a preferred embodiment of the encoder of the present invention used for encoding a digital wide-aspect-ratio television signal includes an interlace-to-progressive-scan converter 10, a 5.5 MHz low-pass filter 11, a 1.5 MHz low-pass filter 12, a 0.6 MHz low-pass filter 13, a first vertical filter 14, a second vertical filter 15, a quadrature modulator/multiplexer 16, a switching system 17, a side panel encoder 18, a 2.0 MHz low-pass filter 19 a subtraction unit 20, a third vertical filter 21, a first summation unit 22, a second summation unit 23, a one-line FIFO 24, a 30-line FIFO 25, a progressive-scan-to-interlace converter 26 and an inverter 27.

A timing circuit (not shown) generates timing signals for controlling the operation of the encoder of FIG. 3. Such timing signals are generated in response to the detection of synchronization and/or clock signals in a wide-aspect-ratio video signal 29.

The interlace-to-progressive-scan converter 10 converts an interlaced wide-aspect-ratio video signal 29 into a progressively scanned 525-lines-per-picture-height 60-frames-per-second video signal having a luminance component Y, and chrominance components I and Q. In those cases where the video signal source was not derived from 24 frames/second film, however, each frame is repeated twice. Thus, even though the sample rate is 60 frames/second, the effective rate is only 30 frames/second.

The luminance component Y is filtered by the 5.5 MHz low-pass filter 11 in this preferred embodiment in which the invention is used for encoding a wide-aspect-ratio television signal for satellite transmission. The filter Y component is provided to the Y terminal of the switching system 17. In an embodiment of the invention used for encoding a wide-aspect-ratio television signal for terrestial and cable transmissions, a 4.2 MHz low-pass filter is substituted for the 5.5 MHz low-pass filter 11. In both embodiments, this filter 11 determines the cutoff frequency that defines the maximum horizontal resolution of the picture, with the luminance information being within a frequency range below this cut-off frequency.

The I chrominance component is filtered by the 1.5 MHz low-pass filter 12 and the first vertical filter 14. The Q chrominance component is filtered by the 0.6 MHz low-pass filter 13 and the second vertical filter 15. The first and second vertical filters 14, 15 are four-line vertical filters. A four-line vertical filter provides a one-line output signal, in which each pixel is the average of pixels that are vertically aligned in four sampled lines. Accordingly the first and second vertical filters 14, 15 each provide a single one-line-vertically-averaged signal for the I and Q chrominance components from every four successive progressively scanned lines. Thus, the first and second vertical filters 14, 15 reduce the vertical resolution of the chrominance information to 65 cycles/picture height, which corresponds to 131 horizontal lines/picture height. Even after such vertical filtering the vertical resolution of the chrominance information still is well above the horizontal resolution of the chrominance information.

The outputs from the first and second vertical filters 14, 15 are modulated on a standard NTSC 3.58 MHz subcarrier and quadrature multiplexed by the quadrature modulator/multiplexer 16 to provide a composite chrominance component to the chrominance terminal C of the switching system 17. The quadrature modulator/multiplexer 16 further contains a 4.2 MHz low-pass filter for limiting the upper end of the chrominance frequency band to 4.2 MHz. The chrominance component C thus occupies a predetermined frequency band below the cutoff frequency, with the I component occupying a 2.0 MHz band extending 0.6 MHz above and 1.5 MHz below the subcarrier frequency and the Q component occupying a 1.2 MHz band extending 0.6 MHz above and below the subcarrier frequency. This is the same frequency band as is occupied by the chrominance component in a standard NTSC video transmission.

The switching system 17 responds to a timing signal that indicates whether the segments of the luminance and chrominance information provided to the switching system 17 are from the side panels or the center panel of the wide-aspect-ratio video signal 29. When the timing signal indicates that the segments of the luminance and chrominance information provided to the switching system 17 are from the side panels of the wide-aspect-ratio video signal 29, the switching system 17 connects the outputs of the 5.5 MHz low-pass filter 11 and the quadrature modulator/multiplexer 16 to the side panel encoder 18. When the timing signal indicates that the segments of the luminance and chrominance information provided to the switching system 17 are from the center panel of the wide-aspect-ratio video signal 29, the switching system connects the output of the 5.5 MHz low-pass filter 11 to the 2.0 MHz low-pass filter 19 and the subtraction unit 20, and connects the output of the quadrature modulator/multiplexer 16 to the second summation unit 23.

The center-panel luminance information segment $Y_{CP}$ is divided into low-horizontal-frequency luminance information (horizontal lows) and high-horizontal-frequency luminance information (horizontal highs) by filtering the segment $Y_{CP}$ with the 2.0 MHz low-pass filter 19 to provide the horizontal lows (HL), and subtracting the horizontal lows from the segment $Y_{CP}$ with the subtraction unit 20 to provide the horizontal highs (HH). The horizontal highs are then vertically filtered by the two-line vertical filter 21 to reduce the vertical resolution to 131 cycles/picture height to thereby provide a component including horizontal highs and low-vertical-frequency luminance information (vertical lows). This horizontal-highs and vertical-lows component (HH, VL) component is then added to the horizontal lows by the second summation unit 22 to provide a modified center-panel luminance information components $Y_{CPM}$. The reduction in diagonal resolution accomplished by this processing of the center-panel luminance information $Y_{CP}$ to eliminate a combined horizontal-highs and vertical highs component enhances separation of the center-panel luminance information from the augmentation signals and the chrominance information by the decoder of the present invention.

In summary, the center-panel luminance information that is transmitted includes a horizontal-highs and vertical-lows component (HH, VL), a horizontal-lows and vertical-lows component (HL, VL), and a horizontal-lows and vertical-highs component (HL, VH). The vertical highs are in a range of from 131 to 262 cycles/picture height; the vertical lows are in a range of from 0 to 131 cycles/picture height; the horizontal lows are in a range of from zero to 2.0 MHz; and the horizontal highs are in a range of from 2.0 MHz to the horizontal cut-off frequency.

Figure 4:
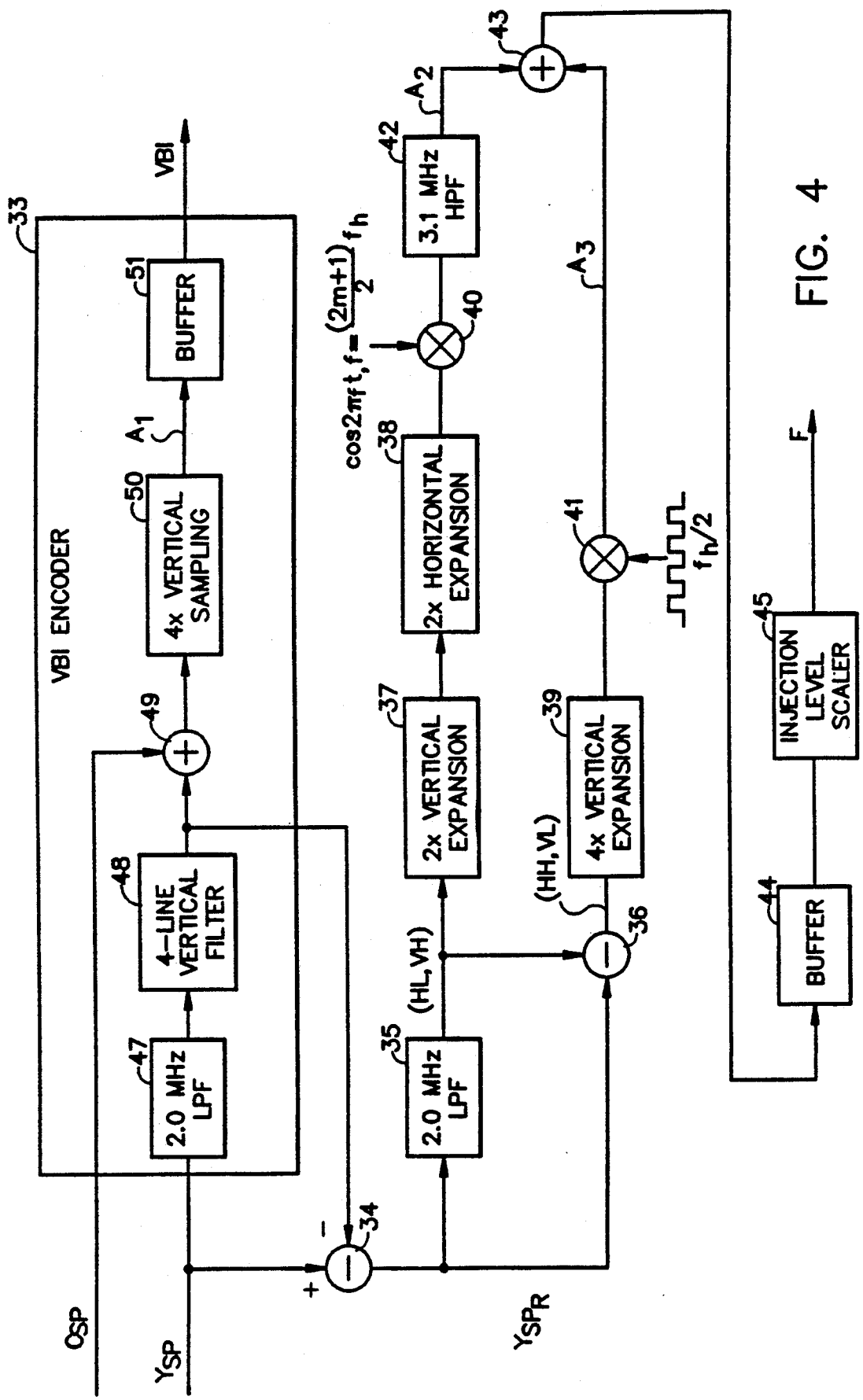
FIG. 4 is a block diagram of the side-panel encoder included in the encoder of FIG. 3.

Referring to FIG. 4, the side panel encoder 18 of FIG. 3 includes a VBI encoder 33, a first subtraction unit 34, a 2.0 MHz low-pass filter 35, a second subtraction unit 36, a two-times vertical expansion unit 37, a two-times horizontal expansion unit 38, a four-times vertical expansion unit 39, a first multiplier 40, a second multiplier 41, a high-pass filter 42, a summation unit 43, a buffer 44 and an injection level scaler 45. The VBI encoder includes a 2.0 MHz low-pass filter 47, a four-line vertical filter 48, a summation unit 49, a four-times vertical sampling unit 50 and a buffer 51. The expansion units 37 and 39 are implemented by vertical FIFOs. The two-times vertical expansion unit 37 clocks out lines of side panel information at one-half the vertical rate at which the lines are clocked into its FIFO; and the four-times vertical expansion unit 39 clocks out lines of side panel information at one-fourth the vertical rate at which the lines are clocked into its FIFO. The expansion provided by these vertical expansion units 37 and 39 is a spatial expansion, which is equivalent to contraction in the spatial frequency domain.

Figure 4A:
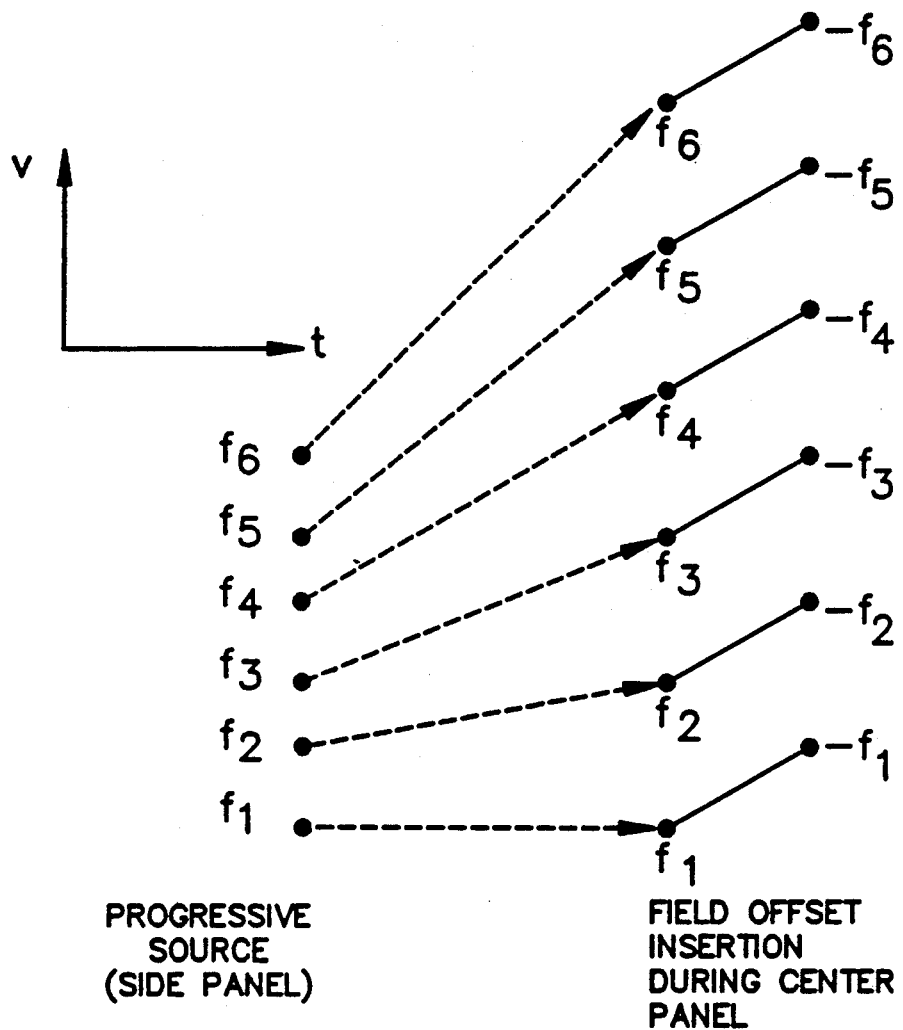
FIG. 4A illustrates the spatial-temporal operation of the two-times vertical expansion unit in the side-panel encoder of FIG. 4.

Referring to FIG. 4A, which illustrates the spatial-temporal operation of the two-times vertical expansion unit 37, it is seen that those features $f_1$, $f_2$, $f_3$, $f_4$, $f_5$, $f_6$, etc. in the side panel image that occupy n vertical lines will occupy 2n vertical lines in the second augmentation signal that is inserted into the Fukinuki hole, with the repeated features in adjacent fields being 180 degrees out of phase with each other.

The two-times horizontal expansion unit 38 is implemented by a horizontal FIFO, in which the pixels in each line are clocked in at twice the horizontal rate at which they are clocked out. The last FIFO line of the two-times vertical expansion unit 37 may be used at the horizontal FIFO for the two-times vertical expansion unit 38.

The side-panel luminance information segment $Y_{SP}$ is filtered by the 2.0 MHz low-pass filter 47 to provide horizontal lows (HL) of the luminance component, and then vertically filtered by the four-line vertical filter 48 to reduce the vertical resolution to 65 cycles/picture height to thereby provide a luminance component including horizontal lows and vertical lows (HL, VL). This horizontal-lows and vertical-lows luminance component (HL, VL) component is then added to the side-panel chrominance information $C_{SP}$ by the summation unit 49 and sampled by the vertical sampling unit 50 at four times the vertical sampling rate to provide a first augmentation signal $A_1$. The first augmentation signal $A_1$ is buffered by the buffer 51 for insertion into the vertical blanking interval (VBI) of the transmitted video signal.

Due to the vertical filtering of both the luminance component and the chrominance component (FIG. 3), only one of every four lines needs to be sent. Hence, a data reduction rate of four is achieved without resorting to horizontal compression and its associated FM S/N penalty.

Quadrature multiplexing the I and Q chrominance components onto the same 3.58 Mhz subcarrier as the center panel chrominance not only eliminates spectral overlap in the horizontal dimension between luminance and chrominance, but maximizes the likelihood that the center panel and side panel chrominance will have similar properties.

The side-panel luminance components not sent in the VBI are included in second and third augmentation signals $A_2$ and $A_3$ and inserted into the Fukinuki holes.

The second augmentation signal includes a horizontal-lows and vertical-highs information component, and the third augmentation signal includes a horizontal-highs and vertical-lows information component, as shown by the distinctive cross-hatching of each such component in FIG. 5A. The left portion of FIG. 5A illustrates these two components with respect to the dimensions of vertical frequency, horizontal frequency and temporal frequency. The center and right portions of FIG. 5A illustrate the formation of the second and third augmentation signals including these two components and their insertion into the Fukinuki holes.

Referring again to FIG. 4, the side-panel horizontal-lows and vertical-lows luminance information component provided at the output of the four-line vertical filter 48 in the VBI encoder 34 is subtracted from the side-panel luminance information segment $Y_{SP}$ by the first subtraction unit 34 to provide a residual side-panel luminance information signal $Y_{SPR}$. The residual side-panel luminance information signal $Y_{SPR}$ is filtered by the 2.0 MHz low-pass filter 35 to provide the horizontal-lows and vertical-highs information component (HL, VH). The horizontal-lows and vertical-highs information component (HL, VH) is subtracted from the residual side-panel luminance information signal $Y_{SPR}$ by the second subtraction unit 36 to provide the horizontal-highs and vertical-lows information component (HH, VL). These two side-panel luminance information components (HL, VH) and (HH, VL) at this stage of their processing are shown in the left portion of FIG. 5a.

Due to the limited bandwidth of the Fukinuki holes, the spectral extent of the horizontal-lows and vertical-highs information component (HL, VH) is contracted in both the horizontal and vertical-frequency dimensions. This is accomplished by temporally expanding this component by a factor of two vertically with the two-times vertical expansion unit 37, and by a factor of two horizontally with the two-times horizontal expansion unit 38.

The horizontal-highs and vertical-lows side-panel luminance component (HH, VL) is contracted in vertical-frequency dimensions by temporally expanding by this component by a factor of four vertically with the four-times vertical expansion unit 39.

The effects of the vertical and horizontal expansion of the horizontal-lows and vertical-highs component (HL, VH) and of the vertical expansion of the horizontal-highs and vertical-lows component (HH, VL) is illustrated in the center portion of FIG. 5A.

Figure 1:
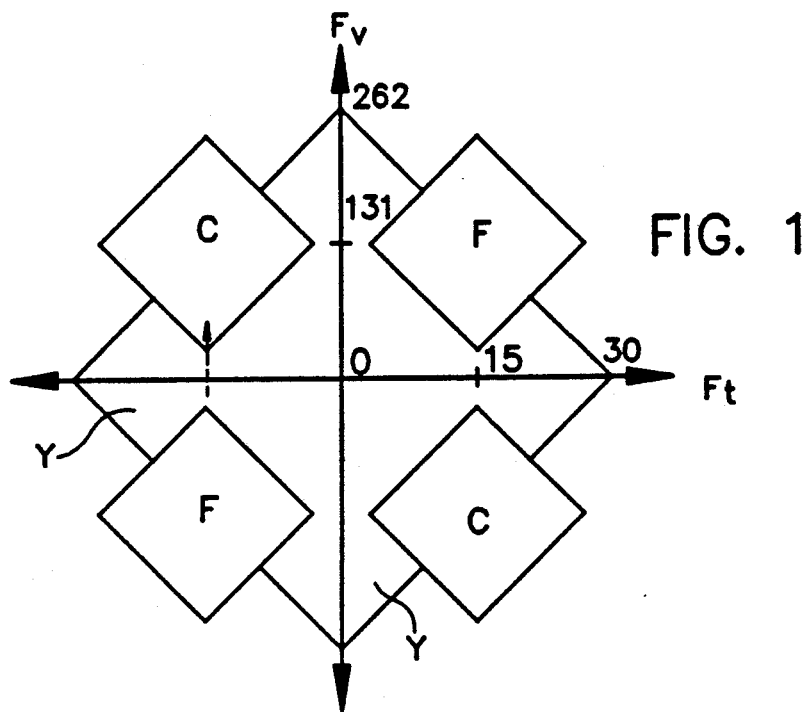
FIG. 1 is a diagram showing the location of chrominance information and the Fukinuki holes in alternate quadrants of the temporal-vertical-frequency domain of a standard NTSC signal.
Figure 2:
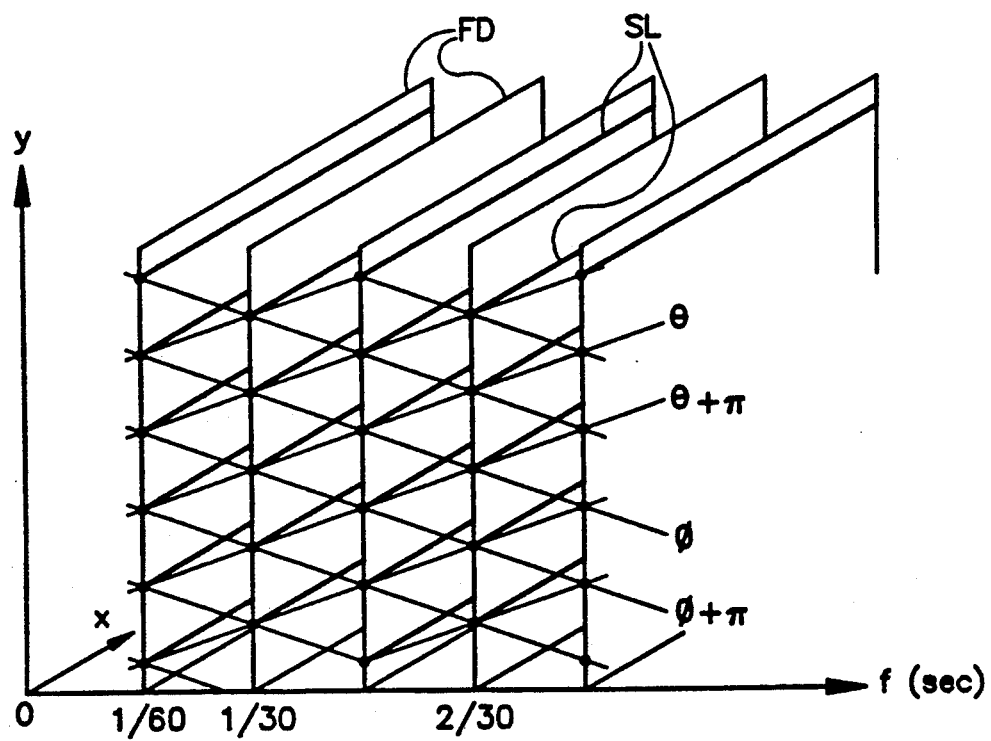
FIG. 2 is a diagram showing the line-to-line and field-to-field phase relationships of both the chrominance information and the Fukinuki holes.

For insertion in the Fukinuki holes, the horizontal-lows and vertical-highs component (HL, VH) is modulated by the multiplier 40 onto a subcarrier having the line-to-line and field-to-field Fukinuki phase relationships that are shown in FIG. 2, and restricted to a single upper-sideband format by the 3.1 MHz high-pass filter 42 to provide the second augmentation signal $A_2$. The frequency of the subcarrier is $f = \{(2m+1)/2\}f_h$, which is approximately 3.1 MHz. Noise is reduced by selecting single sideband rather than double sideband, and by choosing the upper sideband rather than the lower, since humans' reduced sensitivity to high frequencies minimizes the visibility of triangular FM noise. Also a lower sideband format would require a higher horizontal subcarrier frequency, and would therefore reduce the S/N ratio.

The factor-of-four vertical contraction of the horizontal-highs and vertical lows sideband luminance component (HH, VL) allows this component to fit into the vacant band of 0 to 65 cycles/picture height in the horizontal-lows and vertical highs component (HL, VH) after both components are contracted. This vacant band was initially occupied by the horizontal-lows and vertical-lows component that was subtracted out for transmission during the VBI.

By using the same four-point vertical averaging process that was used to isolate the VBI component, it remains possible to perfectly separate components 1 and 2 in the absence of nonlinearities.

Since the horizontal-highs and vertical lows sideband luminance component (HH, VL) already occupies the desired horizontal band in the frequency spectrum, insertion in the Fukinuki holes only requires modulation in the vertical and temporal dimensions. This is accomplished by introducing a 180 degree phase shift from line to line and field to field. In other words, if the horizontal-highs and vertical lows sideband luminance component (HH, VL) is added to one line, then it must be subtracted from the adjacent lines in the same field as well as from certain adjacent lines in the previous and following fields. To accomplish such phase shift, the contracted horizontal-highs and vertical lows sideband luminance component (HH, VL) provided by the four-times vertical expansion unit 39 is mixed by the multiplier 41 with a square wave to provide the third augmentation signal $A_3$. The frequency of the square wave is $f_h/2$. The second augmentation signal $A_2$ and the third augmentation signal $A_3$ are combined by the summation unit 43, buffered by the buffer 44 and scaled by the injection level scaler 45 for insertion in the Fukinuki hole F, as illustrated in the right portion of FIG. 5A.

The vertical-temporal resolution of the combined second and third augmentation signals is limited to further accommodate the insertion thereof into the limited bandwidth of the Fukinuki holes, by the injection level scaler 45. This last step is possible due to the 30 frames/second restriction initially imposed on the frame rate (not the display rate).

Hence the total side-panel expansion factor is eight, if referenced to the 525/60/1:1 standard, or four, if referenced to the conventional 525/60/2:1 standard that will be used for transmission. Assuming a 5:3 display format, this allows complete overlap of the side panels with the larger center panel, as shown in FIG. 5B. In a 16:9 system, however, the horizontal expansion rate would be limited to 1.5.

FIG. 5B illustrates the encoding of left side-panel segments of luminance information L1, L2, L3, L4 and of right side-panel segments of luminance information R1, R2, R3, R4, as shown in the left portion of FIG. 5B to form a horizontal-lows and vertical-highs luminance information component and a horizontal-highs and vertical-lows luminance information component, as shown in the center portion of FIG. 5B. These components are identified by the same distinctive cross-hatching as used in FIG. 5A. These encoded components are transmitted during the Fukinuki holes of the center panel video information, as shown separately in the center portion of FIG. 5B, and as shown in combination with each other in the right portion of FIG. 5B. The inclusion of additional side-panel luminance information during the VBI also is shown in the right portion of FIG. 5B.

Referring again to FIG. 3, the second and third augmentation signals $A_2$ and $A_3$ in the Fukinuki holes F are combined by the second summation unit 23 with the modified center-panel luminance information components $Y_{CPM}$ and the center-panel chrominance information $C_{CP}$ and entered into the one-line FIFO 24.

The first augmentation signal $A_1$ provided for transmission during the vertical blanking interval (VBI) is provided to the 30-line FIFO 25.

A timing signal VBI FLAG from the timing circuit and indicating whether the video signal scan is in the VBI is provided to the one-line FIFO 24 via the inverter 27 and directly to 30-line FIFO 25 to cause the encoded video information to be transferred to the progressive-scan-to-interlace converter 26 from the 30-line FIFO 25 during the VBI and from the one-line FIFO 24 at all other times.

Figure 6A:
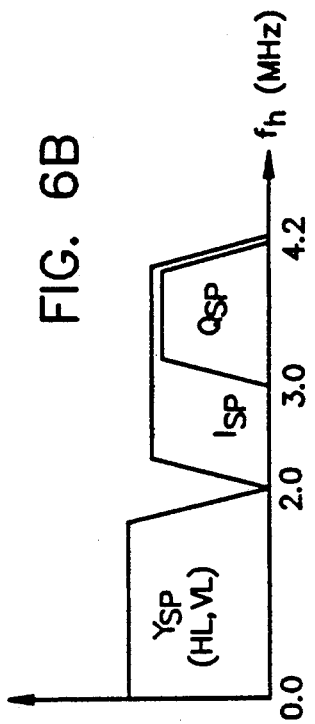
FIG. 6A is a diagram of the frequency spectrum of that portion of the wide-aspect-ratio television signal encoded by the encoder of FIG. 3 that is provided other than during the vertical blanking interval.
Figure 6B:
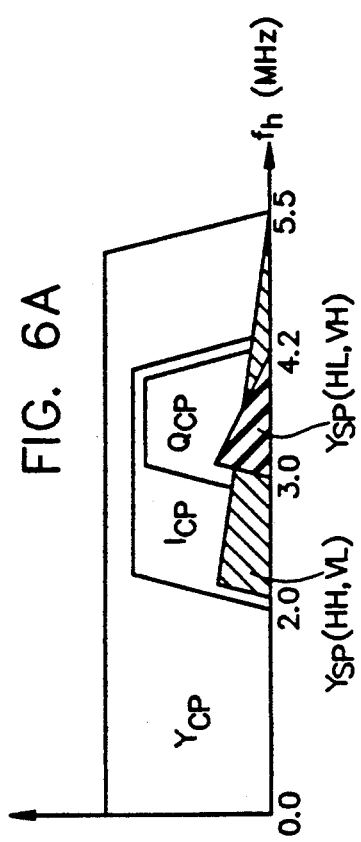
FIG. 6B is a diagram of the frequency spectrum of that portion of the wide-aspect-ratio television signal encoded by the encoder of FIG. 3 that is provided during the vertical blanking interval.

The resulting horizontal frequency spectrum is shown in FIGS. 6A and 6B. FIG. 6A illustrates the frequency spectrum of that portion of the wide-aspect-ratio television signal that is provided other than during the vertical blanking interval. FIG. 6B illustrates the frequency spectrum of that portion of the wide-aspect-ratio television signal that is provided during the vertical blanking interval.

The progressive-scan-to-interlace converter 26 converts the encoded progressively scanned video signal into an interlaced encoded wide-aspect-ratio video signal 55 for transmission.

Figure 7:
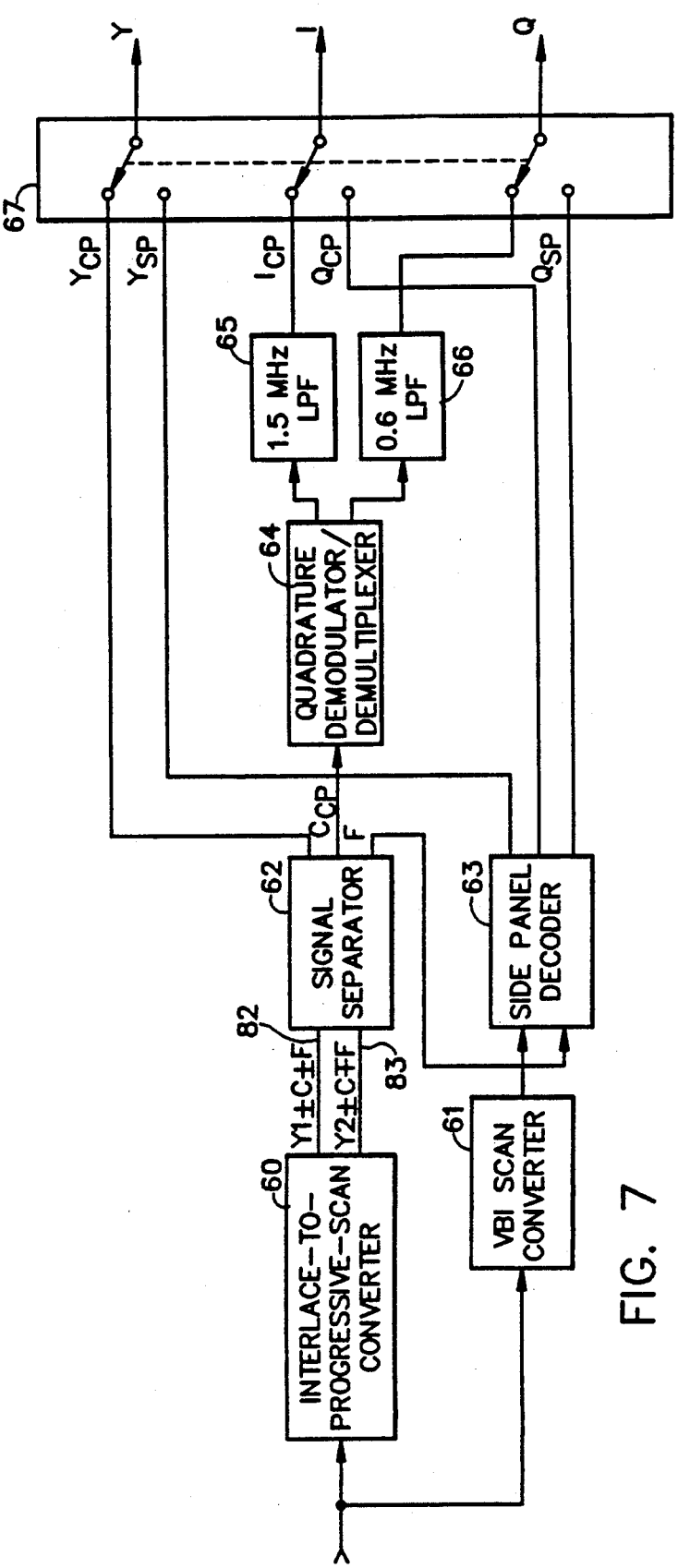
FIG. 7 is a block diagram of the decoder of the present invention.

Referring to FIG. 7, a preferred embodiment of the decoder of the present invention includes an interlace-to-progressive-scan converter 60, a VBI scan converter 61, a signal separator 62, a side panel decoder 63, a quadrature demodulator/demultiplexer 64, a 1.5 MHz low-pass filter 65, a 0.6 MHz low-pass filter 66 and a switching system 67.

The interlace-to-progressive-scan converter 60 converts the interlaced encoded wide-aspect-ratio video signal 55 provided by the encoder of FIG. 3 into a progressively scanned encoded video signal, from which two adjacent lines in two adjacent fields are respectively provided as a composite $(Y1 \pm C \pm F)$ signal and a composite $(Y2 \pm C \mp F)$ signal, wherein Y1 and Y2 are center-panel luminance information, C is center-panel chrominance information, and F is the second and third augmentation signals that were inserted into the Fukinuki holes.

The signal separator 62 processes the composite $(Y1 \pm C \pm F)$ and $(Y2 \pm C \mp F)$ signals from two adjacent lines in two adjacent fields to separate the $Y_{CP}$, $C_{CP}$ and F components. The $Y_{CP}$ component is provided to the switching system 67. The $C_{CP}$ component is provided to the quadrature demodulator/demultiplexer 64, and the F component is provided to the side panel decoder 63.

Figure 13:
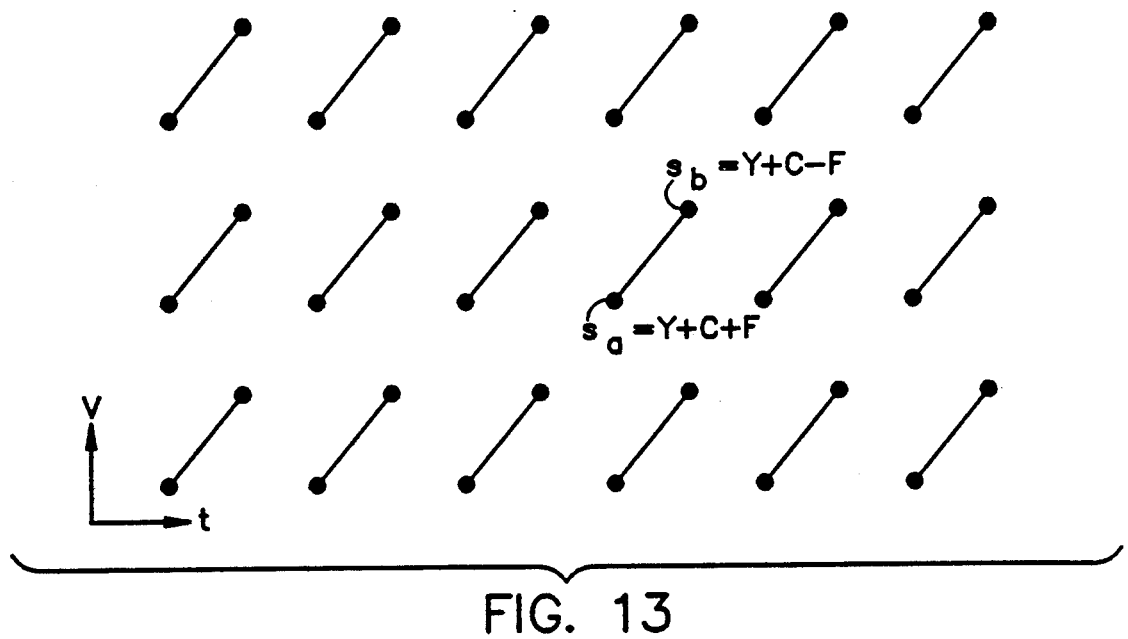
FIG. 13 illustrates the pixels that are processed by the signal separator of FIG. 7 when the encoded video signal originated from a 30 frames-per-second video signal.

The signal separator 62 uses the same technique for separating the center panel information from side-panel information inserted in the Fukinuki holes as is used in the ACTV system. Pixels are first grouped into pairs spanning two adjacent lines in two adjacent fields, as shown in FIG. 13. If the augmentation signals inserted in the Fukinuki holes F, the Fukinuki-encoded augmentation signal F, the center-panel chrominance information C and the component of center-panel luminance Y exceeding 2 MHz are each constrained to have the same values at two different pixel locations, then it becomes possible to extract the augmentation signals F. This is because of the 180 phase shift that affects the Fukinuki subcarrier but not the chrominance subcarrier.

$$Y + C = \frac{S_a + S_b}{2} \qquad \{\text{Eq. 1}\}$$

-continued $$F = \frac{S_a - S_b}{2} \quad \{Eq. 2\}$$

Separation of center panel luminance and chrominance is then performed by conventional line comb filtering.

The present invention provides better separation of the chrominance and luminance components because the encoder reduced the diagonal resolution of the luminance information and the vertical resolution of chrominance information. In both cases, luminance information and chrominance information are fixed at four lines rather than two.

Figure 14:
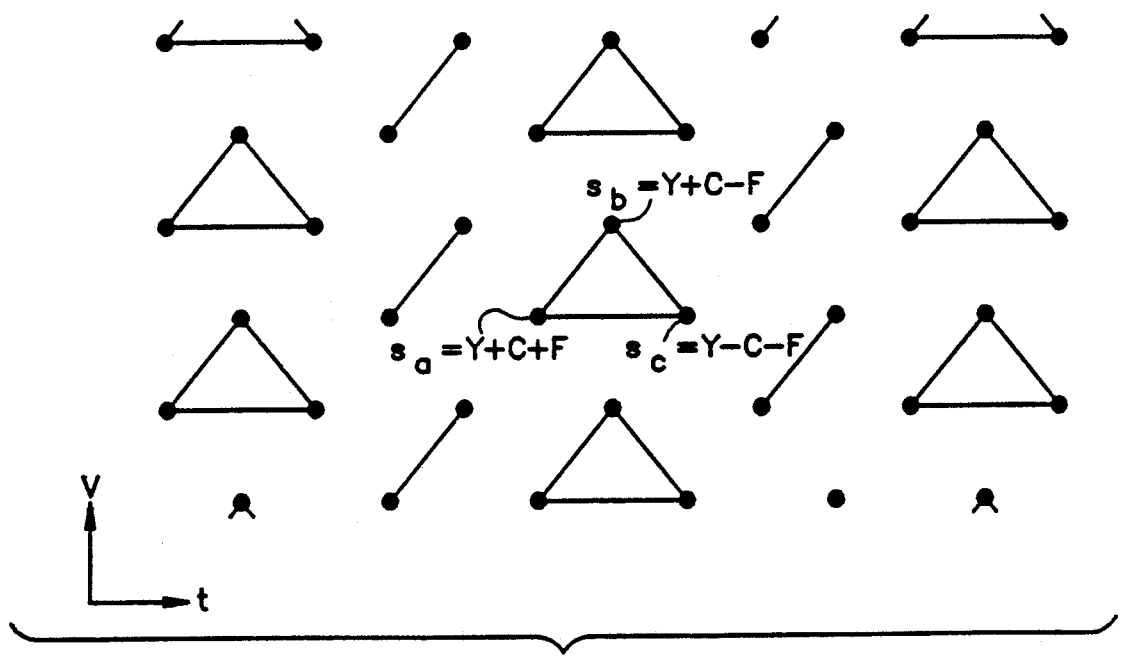
FIG. 14 illustrates additional combinations of pixels that are processed by the signal separator when the encoded video signal originated from a 24 frames-per-second film.

A different chroma/luma structure is used in cases where the video originated from 24 frames/second film (FIG. 14). Since every fifth field is in this case, repeated twice, the pattern is modified in order to avoid averaging across frame boundaries and to utilize the redundant information to provide better chroma luma separation. From FIG. 14 it is clear that $$Y = \frac{S_a + S_c}{2} \quad \{Eq. 3\}$$

$$C = \frac{S_b - S_c}{2} \quad \{Eq. 4\}$$

$$F = \frac{S_a - S_b}{2} \quad \{Eq. 5\}$$

These reconstruction equations are applied during three of every five fields. The remaining two fields are reconstructed by using the same chroma/luma separation method as used during 30 frames/second transmissions.

A method for determining the source of the video is described in U.S. Pat. No. 4,998,257 for "Determination of Sequential Positions of Video Fields Derived from Film".

The quadrature demodulator/demultiplexer 64 demodulates and demultiplexes the center-panel chrominance information component $C_{CP}$ to provide a center-panel I-chrominance information segment $I_{CP}$ and a center-panel Q-chrominance information segment $Q_{CP}$, which are filtered by the 1.5 MHz low-pass filter 65 and the 0.6 MHz low-pass filter 66 respectively and passed to the switching system 67.

The VBI scan converter 61 extracts the first augmentation signal $A_1$ from the VBI.

The side panel decoder 63 processes the first augmentation signal $A_1$ extracted from the VBI and the second and third augmentation signals that were inserted into the Fukinuki holes F to provide a decoded side panel luminance information component $Y_{SP}$, a side-panel I-chrominance information component $I_{SP}$ and a side-panel Q-chrominance information component $Q_{SP}$, all of which are provided to the switching system 67.

During the center-panel intervals of the wide-aspect-ratio video signal the switching system connects the Y, I and Q output terminals to respectively receive the $Y_{CP}$, $I_{CP}$ and $Q_{CP}$ components; and during the side-panel intervals of the wide-aspect-ratio video signal the switching system connects the Y, I and Q output terminals to respectively receive the $Y_{SP}$, $I_{SP}$ and $Q_{SP}$ components.

Figure 8:
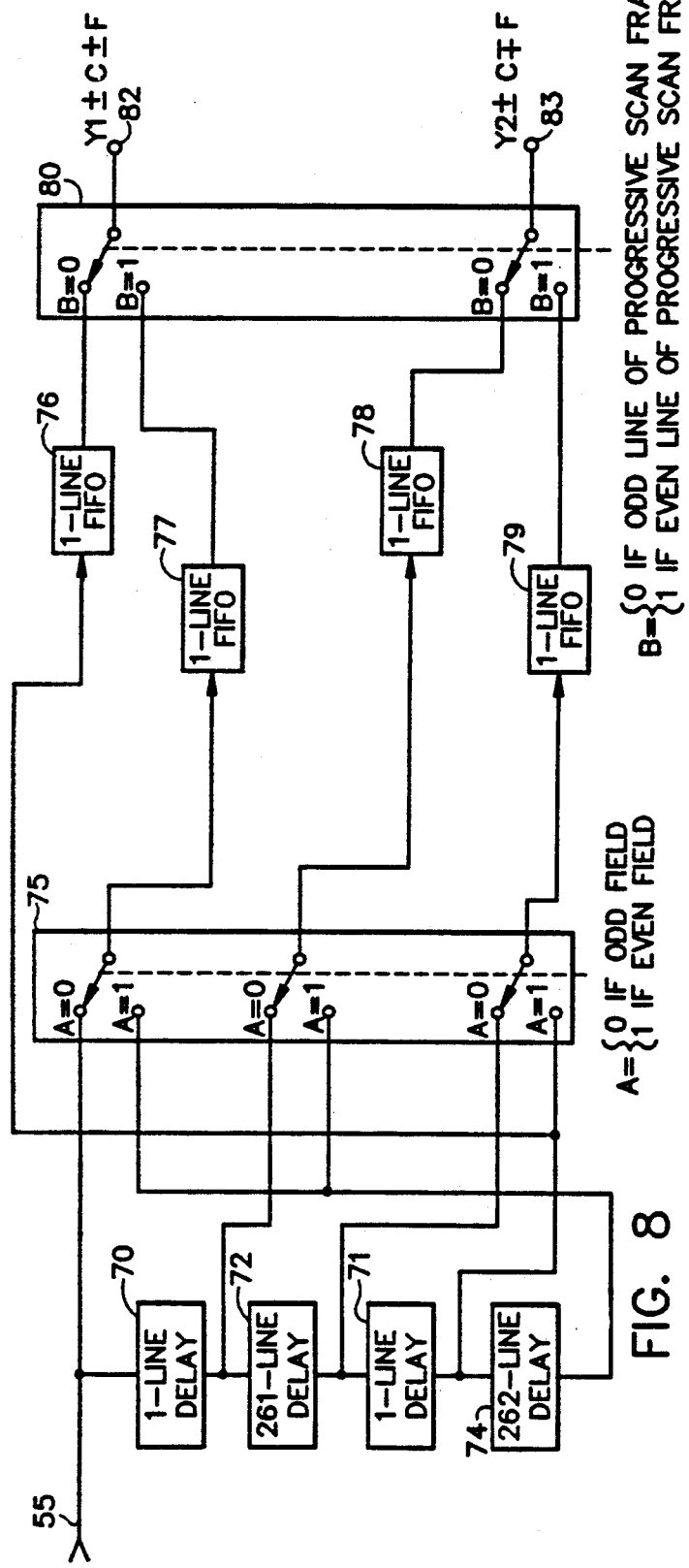
FIG. 8 is a block diagram of the interlace-to-progressive scan converter included in the decoder of FIG. 7.

Referring to FIG. 8, the interlace-to-progressive-scan converter 60 of the decoder of FIG. 7 includes a first one-line delay register 70, a second one-line delay register 71, a 261-line delay register 72, a 262-line delay register 74, a first switching system 75, a first one-line FIFO 76, a second one-line FIFO 77, a third one-line FIFO 78, a fourth one-line FIFO 79 and a second switching system 80.

The interlaced encoded wide-aspect-ratio video signal 55 is passed in series through the first one-line delay register 70, the second one-line delay register 71, the 261-line delay register 72, and the 262-line delay register 74. The input of the first one-line FIFO 76 is connected to the output of the second one-line delay register 71.

During odd fields "0" of the interlaced video signal 55, the first switching system 75 connects the input of the second one-line FIFO 77 to receive the undelayed video signal 55, connects the input of the third one-line FIFO 78 to the output of the output of the first one-line delay register 70, and connects the input of the fourth one-line FIFO 79 to the output of the 261-line delay register 72.

During even fields "1" of the interlaced video signal 55, the first switching system 75 connects the input of the second one-line FIFO 77 to receive the output of the 262-line delay register 74, connects the input of the third one-line FIFO 78 to the output of the output of the 262-line delay register 74, and connects the input of the fourth one-line FIFO 79 to the output of the second one-line delay register 71.

During odd fields "0" of the interlaced video signal 55, the second switching system 80 connects a first output terminal 82 to the output of the first one-line FIFO 76 to provide a composite signal $(Y1+C+F)$ at the first output terminal 82, and connects a second output terminal 83 to the output of the third one-line FIFO 78 to provide a composite signal $(Y2+C-F)$ at the second output terminal 83.

During even fields "1" of the interlaced video signal 55, the second switching system 80 connects the first output terminal 82 to the output of the second one-line FIFO 77 to provide a composite signal $(Y1-C-F)$ at the first output terminal 82, and connects the second output terminal 83 to the output of the fourth one-line FIFO 79 to provide a composite signal $(Y2-C+F)$ at the second output terminal 83.

Figure 9:
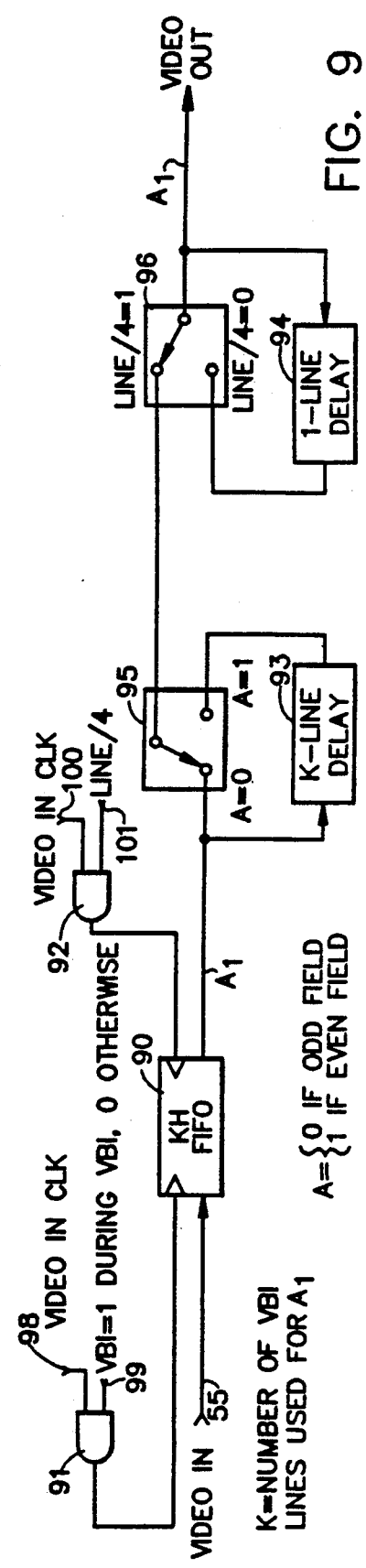
FIG. 9 is a block diagram of the VBI scan converter included in the decoder of FIG. 7.

Referring to FIG. 9, the VBI scan converter 61 of the decoder of FIG. 7 includes a multiple-line (K-line) FIFO 90, a first AND gate 91, a second AND gate 92, a multiple-line delay register 93, a one-line delay register 94, a first switch 95 and a second switch 96. The FIFO 90 has a capacity of K lines and the delay register 93 provides a K-line delay, wherein K is the number of lines of the VBI used for transmitting the video information provided by the first augmentation signal $A_1$.

Figure 12:
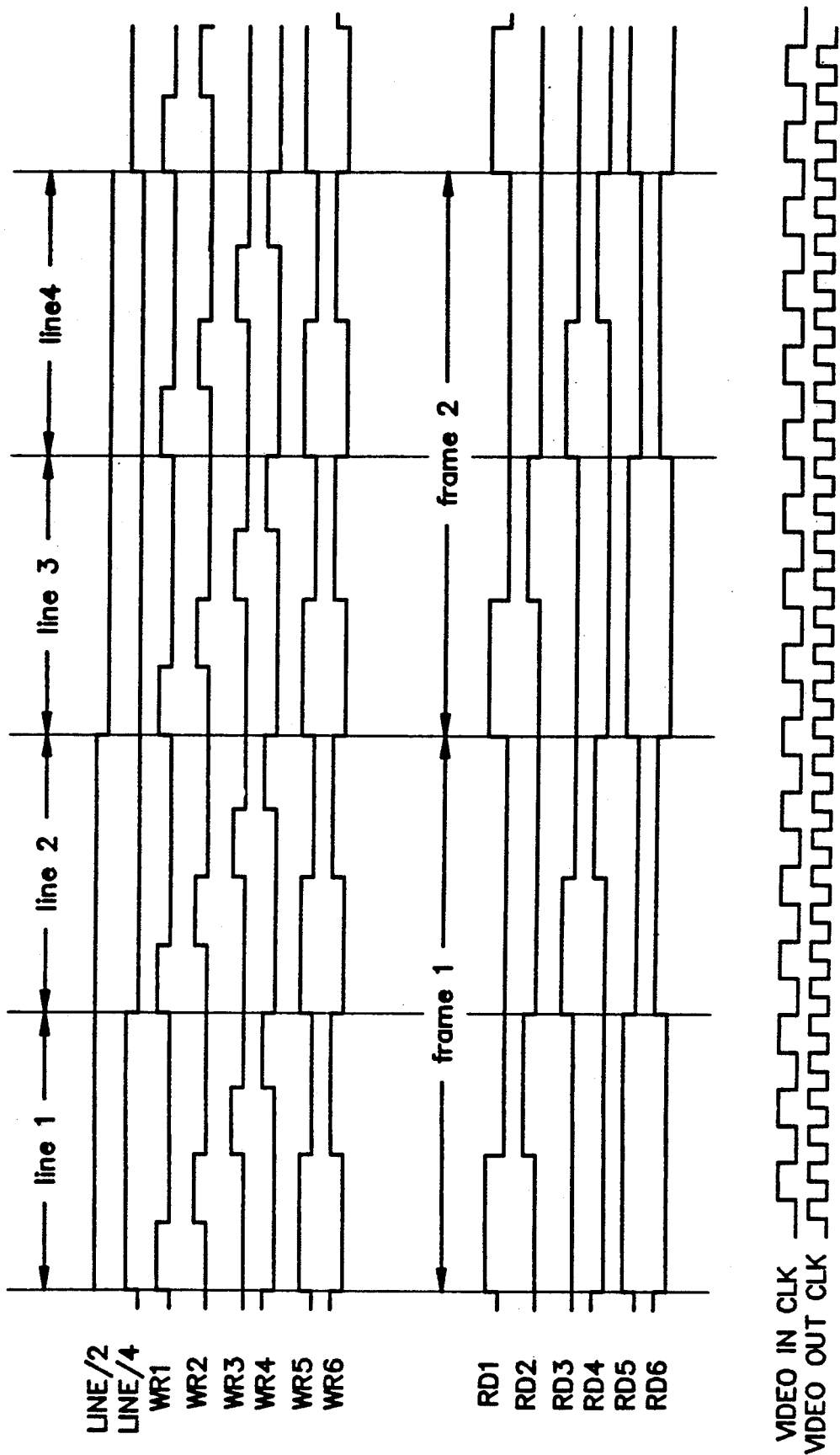
FIG. 12 is a timing diagram for the decoder of FIG. 7.

A video input clock signal 98 and a VBI timing signal 99 are provided to the inputs of the first AND gate 91. The timing of both the video input clock signal 98 and a VBI timing signal 99 is shown in FIG. 12. The video output clock signal is shown in FIG. 12 as being at twice the frequency of the video input clock signal. This is due to the interlaced input format and progressive scan output format. In practice, the video output clock frequency is even higher due to being scaled by the wider aspect ratio (e.g. 5/3 divided by 4/3), and is enabled only during display of the side panels.

The encoded video signal on line 55 is clocked into the FIFO 90 in response to the video input clock signal 98 which is provided to clock the input of the FIFO 90 by the first AND gate 91 when a VBI timing signal assumes a "1" state during the VBI. Accordingly only the first augmentation signal $A_1$, which was transmitted during the VBI, is entered into the FIFO 90.

A video output clock signal 100 and a line/4 timing signal 101 are provided to the inputs of the second AND gate 92. The timing of both the video output clock signal 100 and a line/4 timing signal 101 also is shown in FIG. 12. The line/4 assumes a "1" state during every fourth line, and thereby enables the first augmentation signal $A_1$ to be clocked out of the FIFO during every fourth line.

The K-line delay register 93 delays the extracted first augmentation signal $A_1$ by K lines, and the one-line delay register 94 delays the first augmentation signal by one line.

During an odd field the first switch 95 provides the augmentation signal $A_1$ directly to the switch 96; and during an even field, the first switch 95 provides the augmentation signal $A_1$ to the second switch 96 from the K-line delay register 93.

The position of the second switch 96 is determined by the state of the line/4 timing signal 101. During every fourth line, the line/4 timing signal 101 causes the second switch 96 to provide the augmentation signal $A_1$ as a video output signal from the first switch 95, and during three of every four lines, the second switch 96 provides the augmentation signal $A_1$ as a video output signal from the one-line delay register 94.

Figure 10:
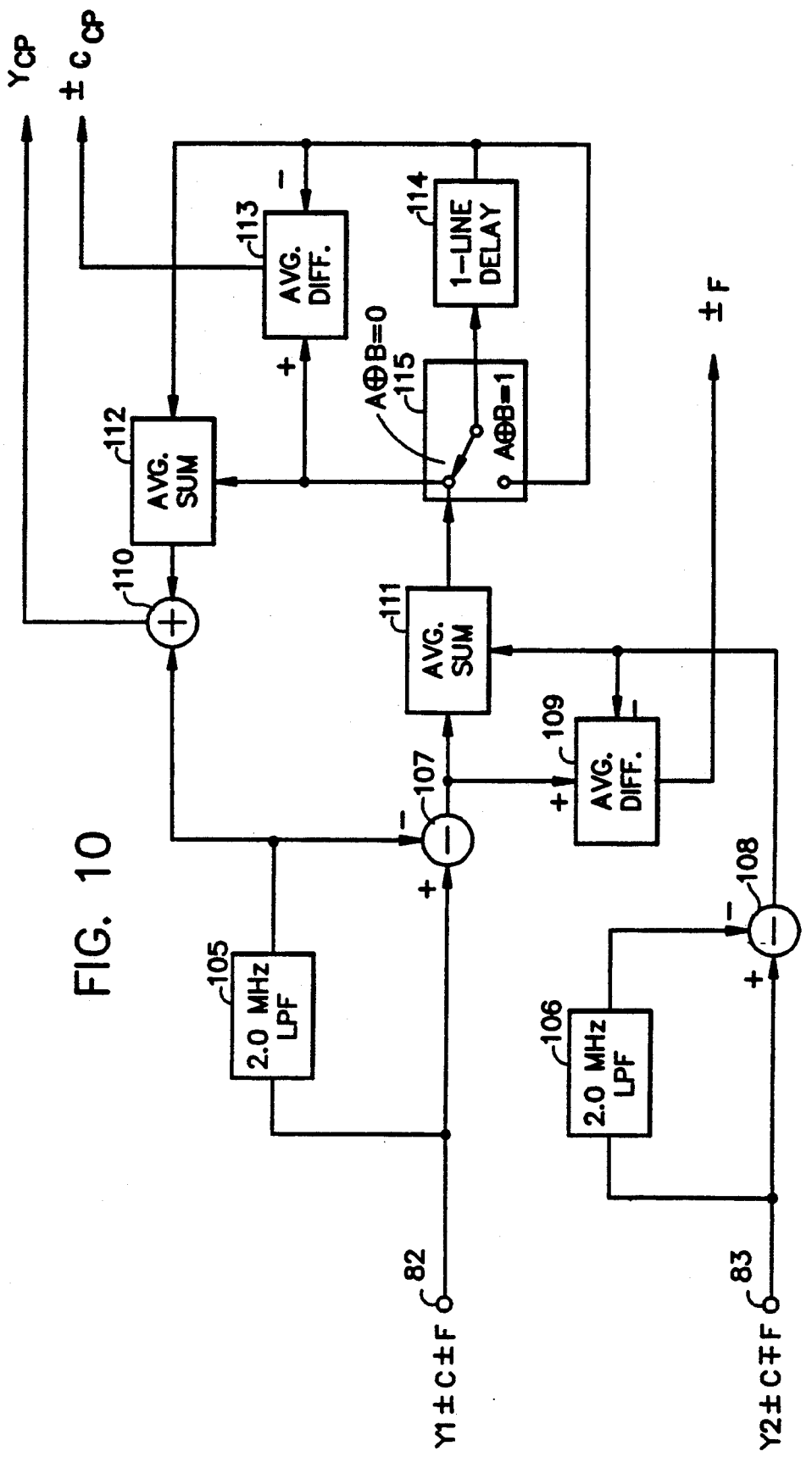
FIG. 10 is a block diagram of the signal separator included in in the decoder of FIG. 7.

Referring to FIG. 10, the signal separator 62 of the decoder of FIG. 7 includes a first 2.0 MHz low-pass filter 105, a second 2.0 MHz low-pass filter 106, a first subtraction unit 107, a second subtraction unit 108, a first difference averaging unit 109, a first summation unit 110, a sum averaging unit 111, a second summation unit 112, a second difference averaging unit 112, a one-line delay register 114 and a switch 115. The switch 115 connects the input of the one-line delay register 114 to the output of the first sum averaging unit 111 during odd lines of odd fields, and during even lines of even fields. The switch 115 connects the input of the one-line delay register 114 to the output of the one-line delay register 114 during even lines of odd fields, and during odd lines of even fields.

The first 2.0 MHz low-pass filter 105 extracts the horizontal-lows luminance information from the composite (Y1±C±F) signal provided at terminal 82; and the first subtraction unit 107 subtracts the extracted horizontal-lows luminance information from the composite (Y1±C±F) signal.

The second 2.0 MHz low-pass filter 106 extracts the horizontal-lows luminance information from the composite (Y2±C±F) signal provided at terminal 83; and the second subtraction unit 108 subtracts the extracted horizontal-lows luminance information from the composite (Y2±C±F) signal.

The first difference averaging unit 109 averages the difference between the outputs from the first subtraction unit 107 and the second subtraction unit 108 to provide the second and third augmentation signals $A_2$ and $A_3$ that were inserted during the Fukinuki holes ±F.

The first sum averaging unit 111 averages the sum of the outputs from the first subtraction unit 107 and the second subtraction unit 108.

The second difference averaging unit 113 averages of the difference of the outputs of the first sum averaging unit 111 and the one-line delay register 114 to provide the center-panel chrominance information component ±C.

The second sum averaging unit 112 averages the sums of the outputs of the first sum averaging unit 111 and the one-line delay register 114 to provide the center-panel horizontal-highs luminance information.

The summation unit 110 combines the center-panel horizontal-lows luminance information provided at output of the first 2.0 MHz low-pass filter 105 with the center-panel horizontal-highs luminance information provided at the output of the second sum averaging unit 112 to provide the center-panel luminance information component $Y_{CP}$.

Figure 11:
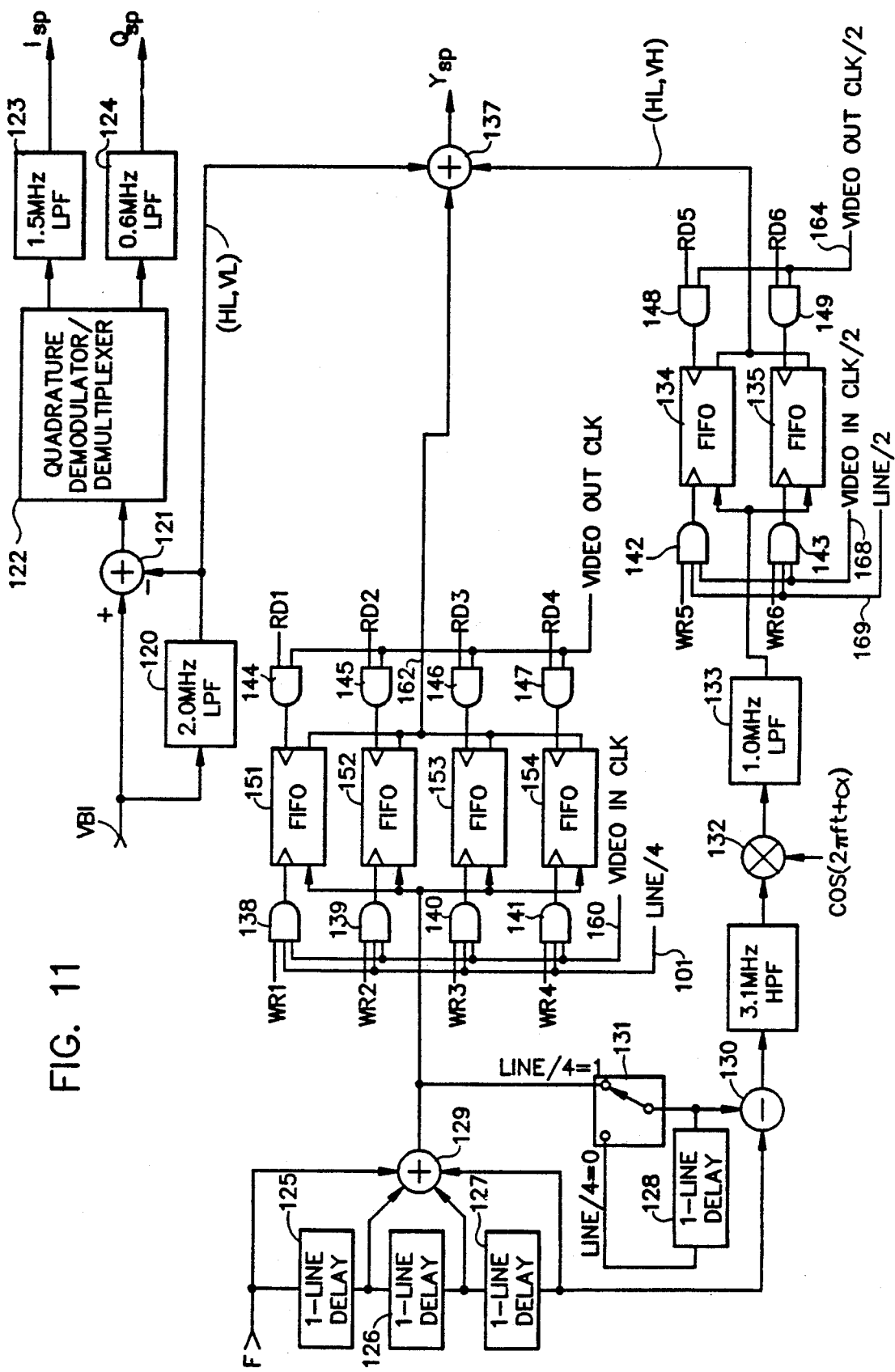
FIG. 11 is a block diagram of the side panel decoder included in in the decoder of FIG. 7.

Referring to FIG. 11, the side panel decoder 63 of the EDTV decoder of FIG. 7 includes a 2.0 MHz low-pass filter 120, a first subtraction unit 121, a quadrature demodulator/demultiplexer 123, a 1.5 MHz low-pass filter 123, a 1.5 MHz low-pass filter 124, first, second, third and fourth one-line delay registers 125, 126, 127 and 128, a first summation unit 129, a second subtraction unit 130, a switch 131, a multiplier 132, a 1 MHz low-pass filter 133 first and second FIFOs 134 and 135, a second summation unit 137, first, second, third, fourth, fifth, sixth, seventh, eighth, ninth, tenth, eleventh and twelfth AND gates 138, 139, 140, 141, 142, 143, 144, 145, 146, 147, 148 and 149, and third, fourth, fifth and sixth FIFOs 151, 152, 153 and 154.

The first augmentation signal $A_1$ transmitted during the VBI is filtered by the 2.0 MHz low-pass filter 120 to provide the horizontal-lows and vertical-lows side-panel luminance information (HL, VL) from the first augmentation signal to a first input of the second summation unit 137.

The first subtraction unit 121 subtracts the horizontal-lows and vertical-lows side-panel luminance information (HL, VL) provided by the filter 120 from the first augmentation signal transmitted during the VBI to provide a composite side-panel chrominance information signal. The composite side-panel chrominance information signal is demodulated and demultiplexed by the quadrature demodulator/demultiplexer 120, and the demultiplexed and demodulated I and Q components are respectively filtered by the 1.5 MHz low-pass filter 123 and the 0.6 low-pass filter 124 to provide reconstructed side-panel I-chrominance information segments $I_{SP}$ and reconstructed side-panel Q-chrominance information segments $Q_{SP}$.

The first and second augmentation signals $A_2$ and $A_3$ transmitted during the Fukinuki hole F are passed through the series-connected first, second and third one-line delay registers 125, 126 and 127. The first summation unit 129 combines the outputs of the first, second and third one-line delay registers 125, 126 and 127 with the undelayed first and second augmentation signals $A_2$ and $A_3$ transmitted during the Fukinuki hole F.

The position of the first switch 131 is determined by the state of the line/4 timing signal 101. During every fourth line, the line/4 timing signal 101 causes the second switch 131 to connect the output of the first summation unit 129 directly to the minus input of the second subtraction unit 130, and during three of every four lines, the first switch 131 provides the information from the output of the first summation 129, as delayed by the fourth one-line delay register 128 to the minus input of the second subtraction unit 130. The plus input of the second subtraction unit 130 is connected to the output of the third one-line delay register 127.

The output of the first subtraction unit 130 is demodulated from the 3.1 MHz by being mixed with a cos $(2>f_t+\alpha)$ signal by the multiplier 132 and filtered by the 1.0 MHz filter 133 to separate the horizontal-lows and vertical-highs side-band luminance information that was included in the second augmentation signal. $f=\{(2m+1)/2\}f_h$ The demodulated and filtered horizontal-lows and vertical-highs side-band luminance information is vertically expanded by the first and second FIFOs 134 and 135 to provide the horizontal-lows and vertical-highs side-band luminance information (HL, VH) to a second input of the second summation unit 137.

The output of the 1.0 MHz low-pass filter 133 is clocked into each of the first and second FIFOs 134 and 135 during the first two of every four lines, as determined by the line/2 timing signal (line 169), at the rate of the video input clock signal/2 (line 168) when enabled by write enable signals WR5 and WR6. The timing of the video input clock signal/2, the line/2 timing signal and the write enable signals WR5 and WR6 is shown in FIG. 12. The write enable signals WR5 and WR6 are respectively provided to an input of the fifth and sixth AND gates 142 and 143, which have their respective outputs connected to the clock input of the first and second FIFOs 134 and 135. The video input clock signal/2 on line 168 is provided to an input of each of the fifth and sixth AND gates 142 and 143.

The horizontal-lows and vertical-highs side-panel luminance information from the second augmentation signal is clocked out of the first and second FIFOs 134 and 135 to a second input to the second summation unit 137 by the video-output-clock/2 signal (line 164), when enabled by read enable signals RD5 and RD6. The timing of the video output clock signal and the read enable signals RD5 and RD6 is shown in FIG. 12. The read enable signals RD5 and RD6 are respectively provided to an input of the eleventh and twelfth AND gates 148 and 149, which have their respective outputs connected to the clock output of the first and second FIFOs 134 and 135. The video-output-clock/2 signal on line 164 is provided to an input of each of the eleventh and twelfth AND gates 148 and 149.

The output of the first summation unit 129 is clocked into each of the third, fourth, fifth and sixth FIFOs 151, 152, 153 and 154 at the rate of the video input clock signal (line 160) during every fourth line, as determined by the line/4 timing signal (line 101), when enabled by write enable signals WR1, WR2, WR3 and WR4. The timing of the video input clock signal, the line/4 timing signal and the write enable signals WR1, WR2, WR3 and WR4 is shown in FIG. 12. The write enable signals WR1, WR2, WR3 and WR4 are respectively provided to an input of the first, second, third and fourth AND gates 138, 139, 140 and 141, which have their respective outputs connected to the clock input of the third, fourth, fifth and sixth FIFOs 151, 152, 153 and 154. The two-times-video-input-clock signal on line 160 and the line/4 timing signal on line 101 are each provided to an input of each of the first, second, third and fourth AND gates 138, 139, 140 and 141.

The horizontal-highs and vertical-lows side-panel luminance information from the third augmentation signal is clocked out of the third, fourth, fifth and sixth FIFOs 151, 152, 153 and 154 onto line 162 by the video output clock signal (line 163), when enabled by read enable signals RD1, RD2, RD3 and RD4. The horizontal-highs and vertical-lows side-panel luminance information (HH, VL) on line 162 is provided to a third input of the second summation unit 137.

The timing of the video output clock signal and the read enable signals RD1, RD2, RD3 and RD4 is shown in FIG. 12. The read enable signals RD1, RD2, RD3 and RD4 are respectively provided to an input of the seventh, eighth, ninth and tenth AND gates 144, 145, 146 and 147, which have their respective outputs connected to the clock output of the third, fourth, fifth and sixth FIFOs 151, 152, 153 and 154. The video output clock signal on line 163 is provided to an input of each of the seventh, eighth, ninth and tenth AND gates 144, 145, 146 and 147.

The second summation unit 137 combines the horizontal-lows and vertical-lows side-panel luminance information (HL, VL) provided to its first input, the horizontal-highs and vertical-lows side-panel luminance information (HH, VL) provided to its second input, and the horizontal-lows and vertical-highs side-panel luminance information (HL, VH) provided to its third input to provide reconstructed side-panel luminance information segments $Y_{SP}$.

Theorectical signal-to-noise values for both the EDTV system of the present invention as described herein and the ACTV system are shown in Table 1.

TABLE 1

| | Center Panel | | Side Panel | |
|---|---|---|---|---|
| | Y | C | Y | C |
| EDTV FM | −0.91 | −0.59 | −6.3 | 0 |
| ACTV FM | −0.81 | −0.59 | −13.3 | −5.1 |
| EDTV AM | −1.26 | −0.59 | −2.0 | 0 |
| ACTV AM | −1.19 | −0.59 | −9.2 | −5.5 |

Values in dB are shown for both AM and FM with an aspect ration of 5:3 and an augmentation signal injection amplitude of 25 IRE. Although this is the amplitude suggested for the ACTV system, it is believed that higher injection amplitudes can be used in the system of the present invention, due to the more effective bandlimiting of the augmentation signal and the relocation of more high energy signal information to the VBI. As can be seen from Table 1, however, the higher injection levels would be necessary only during FM transmission.

The present invention provides an EDTV system which addresses these problems. Using the Fukinuki hole and the Vertical Blanking Interval (VBI), it offers an aspect ratio of 5:3 or 16:9 with pan and scan capability for 4:3 receivers. It offers a S/N advantage of 8 dB compared with a similar system proposed by Isnardi et al., "A Single Channel, NTSC Compatible Widescreen EDTV System", Third International Cooquiuium on Advanced Television Systems: HDTV87, October 4–8, Ottawa, Canada 1987. An additional aspect of the system of the present invention is horizontal resolution of 5.5 Mhz when transmitted over FM channels and full vertical resolution for 525 line progressive scan displays.

We claim:

1. An encoder for encoding a wide-aspect-ratio television signal for transmission within a standard-television-signal-compatible format, comprising
    means for dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from wide-aspect-ratio television signal are displayed in accordance with the wide aspect ratio;

means for arranging the center panel segments for transmission in the standard-television-signal-compatible format;

means for reducing the spatial frequency extent of at least a portion of said side-panel segments by vertically expanding said portion; and means for inserting said vertically expanded portion of the side-panel segments for transmission during transmission of said center-panel segments in a manner that enables said inserted portion of the side panel segments to be separated from the center panel segments.

2. An encoder according to claim 1, wherein said center-panel segments are transmitted in a temporal-vertical-frequency domain that includes Fukinuki holes; and wherein said inserting means include means for inserting said vertically expanded portion of the side-panel segments within said Fukinuki holes.

3. An encoder for encoding a wide-aspect-ratio television signal having luminance information and chrominance information for transmission within a standard-television-signal-compatible format, comprising means for dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio;

means for arranging the center panel segments for transmission in the standard-television-signal-compatible format, which includes a vertical blanking interval;

means for producing an augmentation signal from the side panel segments, which includes side-panel chrominance information and low-horizontal-frequency and low-vertical-frequency side-panel luminance information;

means for modulating the side-panel chrominance information of said augmentation signal within a predetermined frequency band that does not overlap said low-horizontal-frequency and low-vertical-frequency side-panel luminance information; and means for inserting said modulated augmentation signal within the vertical blanking interval for transmission.

4. An encoder according to claim 3, wherein the means for arranging said center panel segments for transmission include means for modulating center-panel chrominance information within said predetermined frequency band.

5. An encoder for encoding a wide-aspect-ratio television signal having luminance information and chrominance information for transmission within a standard-television-signal-compatible format, comprising means for dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio;

means for arranging the center panel segments for transmission in the standard-television-signal-compatible format, which includes a predetermined number of horizontal lines per field, with a first number of the horizontal lines defining a vertical blanking interval, and the chrominance information being within a predetermined frequency band modulated on and extending from a subcarrier frequency, with the chrominance information occupying alternate quadrants of a temporal-vertical-frequency domain;

means for producing first, second and third augmentation signals from the side panel segments, wherein the first augmentation signal includes chrominance information and low-horizontal-frequency and low-vertical-frequency side-panel luminance information, the second augmentation signal includes low-horizontal-frequency and high-vertical-frequency luminance information, and the third augmentation signal includes high-horizontal-frequency and low-vertical-frequency luminance information;

means for modulating the side-panel chrominance information of said first augmentation signal within said predetermined frequency band modulated on and extending from said subcarrier frequency and for inserting said modulated first augmentation signal within the vertical blanking interval;

means for modulating the second augmentation signal within said predetermined frequency band and for inserting said second augmentation signal in first predetermined locations within the Fukinuki holes of said temporal-vertical-frequency domain; and means for inserting the third augmentation signal within second predetermined locations within said Fukinuki holes not occupied by the second augmentation signal.

6. An encoder according to claim 5, wherein the means of producing the first augmentation signal includes means for vertically filtering the luminance and chrominance information and thereby encoding said signals in a substantially smaller number of horizontal lines.

7. An encoder according to claim 5, wherein the means for producing the second augmentation signal includes means for reducing the spatial frequency extent of said second augmentation signal by vertically expanding said low-horizontal-frequency and high-vertical-frequency luminance information for said insertion in the Fukinuki holes.

8. An encoder according to claim 7, wherein the means for producing the third augmentation signal includes means for reducing the spatial frequency extent of said third signal by vertically expanding said high-horizontal-frequency and low-vertical-frequency luminance information for said insertion in the Fukinuki holes.

9. An encoder according to claim 5, wherein the means for producing the third augmentation signal includes means for reducing the spatial frequency extent of said third signal by vertically expanding said highhorizontal-frequency and low-vertical-frequency luminance information for said insertion in the Fukinuki holes.

10. An encoder for encoding a video signal derived from 24-frames-per-second film for transmission, comprising means for processing said video signal to provide luminance information Y, chrominance information C and Fukinuki-hole signals F;

means for processing the luminance information Y, chrominance information C and Fukinuki-hole signals F to provide an encoded signal having composite pixels ($S = Y \pm C \pm F$), wherein the respective values of Y above a given frequency, C and F are the same in each of only three consecutive fields m of every five fields so that within two adjacent lines of each set of said three consecutive fields, $S_a = Y_m \pm C_m \pm F_m$, $S_b = Y_m \pm C_m \mp F_m$ and $S_c = Y_m \mp C_m \mp F_m$, with pixels $S_a$ and $S_c$ being the same pixel in every other field, with $S_a$ and $S_b$ being adjacent pixels in adjacent fields, and with $S_c$ and $S_b$ being adjacent pixels in adjacent fields, and wherein the respective values of Y above a given frequency, C and F are the same in each of two other consecutive fields n of every five fields so that within two adjacent lines of the two other consecutive fields, $S_d = Y_n \pm C_n \pm F_n$ and $S_e = Y_n \pm C_n \pm F_n$, with $S_d$ and $S_e$ being adjacent pixels in adjacent fields.

11. A decoder for reproducing a wide-aspect-ratio television signal from an encoded signal transmitted within a standard-television-signal-compatible format, wherein the wide-aspect-ratio television signal was encoded by dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; arranging the center panel segments for transmission in the standard-television-signal-compatible format; reducing the spatial frequency extent of at least a portion of said side-panel segments by vertically expanding said portion; and inserting said vertically expanded portion of the side-panel segments for transmission during transmission of said center-panel segments in a manner that enables said inserted portion of the side panel segments to be separated from the center panel segments; the decoder comprising means for separating said vertically expanded portion of the side-panel segments from the center-panel segments of the transmitted encoded signal;

means for vertically compressing said vertically expanded portion of the side-panel segments; and means for reproducing the side-panel segments from said vertically compressed portion.

12. A decoder according to claim 11, wherein said center-panel segments were transmitted in a temporal-vertical-frequency domain that includes Fukinuki holes; and said vertically expanded portion of the side-panel segments were inserted within said Fukinuki holes, the decoder comprising means for extracting said vertically expanded portion of the side-panel segments from said Fukinuki holes.

13. A decoder for reproducing a wide-aspect-ratio television signal having luminance information and chrominance information from an encoded signal transmitted within a standard-television-signal-compatible format, wherein the wide-aspect-ratio television signal was encoded by dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; arranging the center panel segments for transmission in the standard-television-signal-compatible format, which includes a vertical blanking interval; producing an augmentation signal from the side panel segments, which includes side-panel chrominance information and low-horizontal-frequency and low-vertical-frequency side-panel luminance information; modulating the side-panel chrominance information of said augmentation signal within a predetermined frequency band that does not overlap said low-horizontal-frequency and low-vertical-frequency side-panel luminance information; and inserting said modulating augmentation signal within the vertical blanking interval for transmission, the decoder comprising means for extracting the augmentation signal from the vertical blanking interval of the encoded signal;

means for reproducing the side-panel chrominance information from the extracted augmentation signal;

means for reproducing the side-panel low-horizontal-frequency and low-vertical-frequency luminance information from the extracted augmentation signal; and means for reproducing the side panel segments from the extracted side-panel chrominance information and the extracted side-panel luminance information.

14. A decoder for reproducing a wide-aspect-ratio television signal having luminance information and chrominance information from an encoded signal transmitted within a standard-television-signal-compatible format, wherein the wide-aspect-ratio television signal was encoded by dividing the television signal into center-panel segments from which the horizontally central portion of a television picture produced from said wide-aspect-ratio television signal is displayed in accordance with a standard-television-signal aspect ratio, and side panel segments from which the left and right side portions of the television picture produced from said wide-aspect-ratio television signal are displayed in accordance with the wide aspect ratio; arranging the center panel segments for transmission in the standard-television-signal-compatible format, which includes a predetermined number of horizontal lines per field, with a first number of the horizontal lines defining a vertical blanking interval, and the chrominance information being within a predetermined frequency band modulated on and extending from a subcarrier frequency, with the chrominance information occupying alternate quadrants of a temporal-vertical-frequency domain; producing first, second and third augmentation signals from the side panel segments, wherein the first augmentation signal includes chrominance information and low-horizontal-frequency and low-vertical-frequency side-panel luminance information, the second augmentation signal includes low-horizontal-frequency and high-vertical-frequency luminance information, and the third augmentation signal includes high-horizontal-frequency and low-vertical-frequency luminance information; modulating the side-panel chrominance information of said first augmentation signal within said predetermined frequency band modulated on and extending from said subcarrier frequency and for inserting said modulated first augmentation signal within the vertical blanking interval; modulating the second augmentation signal within said predetermined frequency band and for inserting said second augmentation signal in first predetermined locations within the Fukinuki holes of said temporal-vertical-frequency domain; and inserting the third augmentation signal within second predetermined locations within said Fukinuki holes not occupied by the second augmentation signal, the decoder comprising

- means for extracting the first augmentation signal from the vertical blanking interval of the encoded signal;
- means for reproducing the side-panel chrominance information from the extracted first augmentation signal;
- means for separating the low-horizontal-frequency and low-vertical-frequency side-panel luminance information from the extracted first augmentation signal;
- means for separating the center-panel luminance and chrominance information and the second and third augmentation signals from each other;
- means for reproducing the side-panel luminance information from the separated low-horizontal-frequency and low-vertical-frequency side-panel luminance information and from the separated second and third augmentation signals;
- means for reproducing the center-panel luminance and chrominance information from the separated center-panel luminance and chrominance information;
- means for combining the reproduced side-panel and center-panel luminance information and chrominance information to reproduce said wide-aspect-ratio television signal.

15. A decoder for reproducing a television signal having luminance information Y and chrominance information C and Fukinuki-hole signals F, which television signal was encoded for transmission within a standard-television-signal-compatible format when the television signal includes video fields derived from 24-frames-per-second film, and wherein said encoded television signal includes composite pixels ($S = Y \pm C \pm F$), wherein the respective values of Y above a given frequency, C and F are the same in each of three consecutive fields of every five fields so that within two adjacent lines of each set of said three consecutive fields, $S_a = Y \pm C \pm F$, $S_b = Y \pm C \mp F$ and $S_c = Y \mp C \mp F$, with pixels $S_a$ and $S_c$ being the same pixel in every other field, with $S_a$ and $S_b$ being adjacent pixels in adjacent fields, and with $S_c$ and $S_b$ being adjacent pixels in adjacent fields, the decoder comprising means for separating said inserted Fukinuki-hole signals from the luminance information and the chrominance information in said three consecutive fields by processing said composite pixels $S_a$, $S_b$ and $S_c$ of said encoded television signal from two adjacent lines in said three consecutive fields in accordance with:

$Y = (S_a + S_c)/2;$ $C = (S_b - S_c)/2;$ and $F = (S_a - S_b)/2.$

* * * * *